United States Patent [19]

Furtek

[11] Patent Number: 5,430,886
[45] Date of Patent: Jul. 4, 1995

[54] METHOD AND APPARATUS FOR MOTION ESTIMATION

[76] Inventor: Frederick C. Furtek, 350 Sharon Park Dr., Menlo Park, Calif. 94025

[21] Appl. No.: 898,862

[22] Filed: Jun. 15, 1992

[51] Int. Cl.$^6$ .................. G06F 11/00; G06F 15/16
[52] U.S. Cl. ..................... 395/800; 364/230.6; 364/231.9; 364/265; 364/DIG. 1; 371/67.1; 348/416; 348/518
[58] Field of Search ............ 395/800, 775, 500, 375, 395/575; 358/105, 107, 133, 135, 136, 139, 148, 448, 452; 341/159, 163; 371/68.1, 67.1, 67.8, 68.3

[56] References Cited

U.S. PATENT DOCUMENTS

| 4,864,393 | 9/1989 | Harradine et al. | 358/105 |
|---|---|---|---|
| 4,875,094 | 10/1989 | Haghiri et al. | 358/105 |
| 4,924,306 | 5/1990 | van der Meer et al. | 358/105 |
| 5,083,202 | 1/1992 | Parke | 358/105 |
| 5,099,325 | 3/1992 | Artieri et al. | 358/136 |
| 5,138,447 | 8/1992 | Shen et al. | 358/133 |

FOREIGN PATENT DOCUMENTS

| 474276A1 | 9/1990 | European Pat. Off. |
| 395293A1 | 10/1990 | European Pat. Off. |
| 2214751 | 9/1989 | United Kingdom |
| 2236449 | 4/1991 | United Kingdom |

OTHER PUBLICATIONS

Colavin et al. "A dedicated circuit for real time motion estimation", 1991, pp. 96–99.
Hsieh et al. "VLSI architecture for block-matching motion estimation algorithm", Jun. 1992, pp. 172–174.
Komarck et al. "VLSI architectures for block-matching algorithms", 1989, pp. 2457–2460.
Sun et al. "A flexible VLSI architecture for full search block matching motion-vector estimation", 1989, pp. 179–182.
Komarek et al. "Array architectures for block-matching algorithms", 1989, pp. 1301–1308.
Artieri and Jutand, "A Versatile and Powerfull Chip For Real Time Motion Estimation", *IEEE Computer*, pp. 2453–2456, (Feb. 1989).
Considine, Bhandal and Gooding, "Single Chip Motion Estimator For Video Codec Applications", Third International Conference On Image Processing and Its Applications, pp. 285–289 (Jul., 1989).
Dianysian and Baker, "Bit-serial architecture for real time motion compensation", *SPIE vol. 1001 Visual Communications and Image Processing '88*, pp. 900–907.

*Primary Examiner*—Alyssa H. Bowler
*Assistant Examiner*—Alpesh M. Shah
*Attorney, Agent, or Firm*—Pennie & Edmonds

[57] ABSTRACT

A method and apparatus for generating a sequence of displacement vectors and associated minimal error values. The vectors and-associated values represent the best match of a current block of elements of a first frame of a signal with one of a plurality of search blocks of elements located within a corresponding search window of a second frame. A first stream of data, representing the elements of the first frame is transmitted to a linear array of processing units; a second stream of data, representing the elements of the second frame is transmitted to the array; a hybrid stream of data from the elements of the second stream is synthesized such that the elements of the hybrid stream are aligned in time with the elements of the first stream so as to enable each processing unit of the array to compute an error between a particular current block and a different search block of the corresponding search window. The error is a measure of the difference between two blocks of elements. Specifically, the errors are computed between each current block and each search block of the corresponding search windows such that each processing unit of the array outputs the computed error essentially immediately after the previous unit outputs the error.

25 Claims, 18 Drawing Sheets (a) Current Frame (b) Preceding Frame Upper Band (c) Preceding Frame Lower Band (d) Preceding Frame Synthesized Band (a) Current Frame  (b) Preceding Frame Upper Band  (c) Preceding Frame Lower Band  (d) Preceding Frame Synthesized Band (a) Current Frame (b) Preceding Frame Upper Band (c) Preceding Frame Lower Band (d) Preceding Frame Synthesized Band (a) Current Frame  (b) Preceding Frame Upper Band  (c) Preceding Frame Lower Band  (d) Preceding Frame Synthesized Band

METHOD AND APPARATUS FOR MOTION ESTIMATION

FIELD OF THE INVENTION

This invention relates to a method and apparatus for comparing sets of data. It is especially useful for estimating inter-frame motion of video data in a video signal and will be described in that context.

BACKGROUND OF THE INVENTION

There are numerous instances in which it is desirable to compare sets of data. Many of these involve recognition of a data set by comparing the set whose identity is unknown with a multitude of known data sets to locate a best match. Illustrative such applications are the extraction of meaningful information from bad communication channels and the recognition of characters and other objects presented on film, video or other display.

In other applications, identification per se may not be the focus but the object of the comparison is still to find the best match. Examples include the comparison of a fragment of a gene sequence with an entire gene sequence or the comparison of sequences of computer software. One specific application is in determining the relative movement of video data between the frames of a video signal. In this case, the data set of interest is a block of pixels in the video frame. The motion of such a block of pixels is quantified by a displacement vector, which indicates the best match for a block of a current frame with one of a plurality of blocks found within a search window defined in a previous frame.

In general, the error between a first set of data having X elements and a second set of data also having X elements in a search window can be represented mathematically by $$\text{Error}(\Delta x) = \sum_{x=0}^{X-1} |c(x) - P(x + \Delta x)|$$

where x is a position in the set of data, $\Delta x$ is the relative displacement between the position of the first set of data and the position of the second set of data, $C(x)$ is a measure of a parameter (or parameters) of interest at position x in the first set of data and $P(x+\Delta x)$ is a measure of the parameter (or parameters) of interest at position $x+\Delta x$ in the second set of data. Thus, the error is calculated by determining for each element in the first set of data, the absolute value of the difference between the parameter of interest at that element and the parameter of interest at the corresponding element of the second set of data and summing these absolute values for all the elements in the first set of data.

In like fashion, the error can be calculated between data sets organized in more than one dimension. For the case of motion estimation in a video display which involves two-dimensional arrays of data representative of signal intensity, the error between a current block having X x Y pixels and a previous block in the search window can be represented mathematically by $$\text{Error}(\Delta x, \Delta y) = \sum_{x=0}^{X-1} \sum_{y=0}^{Y-1} |c(x,y) - P(x + \Delta x, y + \Delta y)|$$

where $(x,y)$ is a position in rectangular coordinates in the current block, $(\Delta x, \Delta y)$ is the displacement between the position of the current block and the position of the previous block in the video frame, $C(x,y)$ is the intensity of a pixel at coordinates $(x,y)$ in the current block, and $P(x+\Delta x, y+\Delta y)$ is the intensity of a pixel in the previous block at coordinates $(x+\Delta x, y+\Delta y)$. Thus, the error is calculated by determining for each pixel in the current block the absolute value of the difference between the intensity at that pixel and the intensity at the corresponding pixel in the previous block in the search window and summing these absolute values for all the pixels in the current block.

To determine the best match, the intensities of the pixels of the current block are compared to the intensities of the corresponding pixels of the search blocks defined within the search window of the previous frame. The accumulated difference in pixel intensities between two blocks is referred to as an error value. The block in the search window which most closely matches the current block is the one having the minimal error value. This block is identified by the displacement vector.

Motion estimation by block matching is a very computation-intensive process. For example, typical values for block size are 16 pixels×16 pixels with approximately 357 blocks per frame. To compare such a block with any other block requires 256 comparisons, one for each pixel. A reasonable size search window for each block is an array of 16×16 blocks. Accordingly, for a frame rate of 30 frames per second, the number of comparisons to be made each second is 30 frames/second×357 blocks/frame×256 search blocks/block×256 comparisons/search block=701,890,560 comparisons/second. If each comparison takes 6 RISC-type instructions per pixel, the amount of processing required is 4,211 MIPS. This is roughly 100 times the processing power of high-performance DSP or RISC chips.

Numerous other applications likewise need enormous amounts of processing power to perform similar types of comparisons. For example, to compare a fragment of a gene sequence of 100 nucleotides against the entire human genome which is approximately 3,000,000,000 nucleotides in length would require 300,000,000,000 comparisons.

To achieve the processing power required for matching large quantities of data, it is desirable to use a multiprocessing architecture. For example, several such systems have been described for matching the blocks of video signals.

For example, A. Artieri, et al., "A Versatile and Powerful Chip for Real Time Motion Estimation" *ICASSP-89*, vol. 4, pp. 2453-2456, describes a systolic architecture wherein the processors are organized as a two-dimensional array and each processor is associated with one possible match of a current block and a block within a search window. At each clock cycle, each processor receives the same current-block data and the search-window data for a different search block. All the processors complete the corresponding computations simultaneously, and transfer the results into a storage array. Then, the minimal error is determined. This architecture is not completely parallel, and it is not pipelined. Significant post-processing and pre-processing stages are necessary in order to provide all the processors with the appropriate data simultaneously and to determine the minimal error. There is a substantial memory requirement at the input and output stages, and each processor of the proposed system contains various input and output storage registers. Accordingly, this system fails to satisfy the requirements of a practical motion-estimation system.

V. Considine, et al., "Single Chip Motion Estimator for Video CODEC Applications," *Third International Conference on Image Processing and its Applications*, pp. 285-289 (July, 1989) relates to another dedicated VLSI multiprocessing architecture for motion estimation. This architecture also employs a two-dimensional array of identical processing units. The inputs to the array are connected to a search-window memory. The current-block pixels are loaded into the memory provided within the array and the search-window pixels are transferred to the array from the search-window memory. The processing units determine the differences between the current block and the search-window pixels. The differences are then summed by a summing tree provided at the outputs of the array. The chip illustrated in this reference contains two structures which include the search-window memory, the array, and the summing tree. This architecture does not provide for a truly pipelined processing. The processing begins only after the data representing the current block and the search-window pixels is stored in the array and in the search-window storage.

R. Dianysian, "Bit-Serial Architecture for Real Time Motion Compensation," Proceedings of the SPIE - *The International Society for Optical Engineering*, vol. 1001, pt. 2, pp. 900–907 (November, 1988) relates to an attempt to provide a bit-serial architecture, which is parallel and pipelined. This architecture is based on a two-dimensional grid of processors and distributed storage registers. The current-block data is loaded into the storage registers prior to the computational process. Then, the search-window data is shifted through the interconnections of the two-dimensional grid of processors. Since this system requires loading the current-block pixels into the processor array prior to the error computation, the processing is not parallel and pipelined at the transitions from one current block of the video signal to the next.

These prior-art systems fail to take full advantage of parallel and pipelined processing. To achieve the throughputs desired, it is necessary to minimize the pre-processing, post-processing, and storage of data. Ideally, the system should generate a continuous stream of error values in response to a continuous input of data. In addition, the desired multiprocessing architecture has to be flexible, so that various parameters of the system, for example, the block sizes, can be varied without additional design effort. Advantageously, the implementation of the system should also be based on a standard cell technology, rather than on custom VLSI.

SUMMARY OF THE INVENTION

Accordingly, an object of the present invention is to provide a parallel and pipelined processor architecture for comparing sets of data. A further object of the present invention is to implement a processor using a multiprocessing architecture such that the processor continuously receives the data of the sets to be compared and outputs a continuous stream of error values. Still another object is to use the present invention for motion estimation.

To determine the best fit between a first data set and the data sets of the search window, the same calculation is performed for each of the data sets of the search window. The best fit is that data set in the search window for which the error is lowest. Accordingly, the calculation provides as its final output the lowest error value and the location in the search window of the data set for which the error value is lowest. Illustratively, this location is specified in terms of the displacement ($\Delta x$).

To calculate the error values, it has been found advantageous to use separate circuitry to calculate and accumulate in parallel the error values for each of the different data sets in the search window. Further, since much the same data is present in successive data sets in the search window, it has also been found advantageous to pipeline the circuitry in a highly efficient fashion.

In accordance with the invention, a linear array of identical processing units receives continuous bit-serial streams of data representing the elements of the first data set and the data sets of the search window and outputs a continuous sequence of error values for each data set of the search window. Each processing unit contains an absolute-difference module for determining the absolute value of the difference between the parameter (or parameters) of interest of one element of a first data set and one element of a search data set and an accumulator which adds the values generated by the absolute difference module. Each processing unit also delays the bit stream of the first data set by one element relative to the bit stream from the search window. This delay of one element per processing unit causes each processing unit to compare the bit stream of the first data set with the bit stream of a different one of the search data sets. As a result, the number of processing units is the same as the number of search data sets.

If, for example, the first data set is a sequence of 256 elements, this can be compared with 256 data sets in a search window of 511 elements using a linear array of 256 processing units. Information about the data sets is supplied to the processing array on an element-by-element basis in the order in which it appears in each data set. Thus, the first processing unit compares the first element of the first data set with the first element of the data set from the search window and adds the result to the accumulator. It then does the same for the second elements of the two data sets, the third elements, and so on for the 256 elements of the first data set.

Because of the delay of one element in the bit stream of the first data set, the first element of the first data set arrives at the second processing unit at the same time as the second element of the data set from the search window. Thus, the second processing unit compares the first element of the first data set with the second element of the data set from the search window, and adds the result to its accumulator; it then does the same for the second element of the first data set and third element of the search data set; and so on for the 256 elements of the first data set.

In like fashion, each of the other processing units compares the elements of the first data set with a set of elements from the search window that is offset by one element from the set that is compared by the previous processing unit.

After the last element of the first data set is supplied to the first processing unit and compared with the 256th element of the search data set and after the result of such comparison is added to the accumulator, the final error value stored in the accumulator is read out and provided to comparison circuitry to determine the minimum error value. . Likewise, the accumulator of each processor unit is read out in turn after the final error value is computed.

The comparison circuitry includes a comparator, comparator registers for storing the bytes of the lowest final error value, a counter and a register for storing a counter value. The counter counts the error values. The comparator registers are initially loaded with all 1's corresponding to the maximum error value. As the final error values are received at the comparator, they are compared with the value stored in the comparator registers. If a final error value is lower than the stored value, the stored value is replaced with the lower value and the counter register is loaded with the counter value which identifies the block of the search window associated with the new lowest error value. At the end of the read out of all the final error values, the EOB signal indicates that the calculation is complete and the comparator registers and counter registers are read to determine the minimum error value and the block of the search window which produced such minimum value.

To estimate motion in a video display in accordance with a preferred embodiment of the invention, the element information from the current block is supplied to the array starting with the pixel in the upper lefthand corner of the block, proceeding downwards through the lefthand most column of pixels in the block, continuing with the pixel that is uppermost in the next column, proceeding downwards through that column and so forth until reaching the last pixel in the bottom righthand corner of the block.

Information about the blocks of the search window is provided in a plurality of data streams. Illustratively, the size of the search window is slightly less than four times the size of the current block. In such case, two bit-serial data streams are supplied in parallel to the array. One stream is derived from the upper half of the search window and is called the upper band (UB), the other stream is derived from the lower half and is called the lower band (LB). In each stream, the order in which the pixel information is supplied is the same as the order in which the pixel information was supplied from the current block. Thus, the pixel information is supplied starting with the pixel in the upper lefthand corner and proceeding down the columns from the leftmost column to the rightmost column and ending with the pixel in the lower righthand corner of that half of the search window. Since each half of the search window is approximately twice as large as the current block, this process takes twice as long as it does to supply the pixel information of the current block.

In addition to these three data streams, the array also receives control information which identifies the start of a block (SOB), and the end of a block (EOB) as well as signals SUB and SLB which select the upper band and the lower band.

Each processing unit of the array has inputs to receive these three data streams and four control signals and outputs to pass these signals on to the next unit of the array. In addition, each processing unit also has two inputs and two outputs for reading out under control of the EOB signal the high and low order bytes of the error value (ELOB and EHOB) calculated at the processing unit. The error value outputs of each processing unit are provided to comparison circuitry described above for determining the minimum error value.

To determine the best match between a current block and the blocks of a search window, bit-serial data streams representing the pixels of the current block as well as the upper and lower halves of the search window are provided to the inputs of the first processing unit of the array. An SOB signal is also provided which resets the accumulator of each processing unit as it propagates through the array.

The first processing unit calculates the absolute value of the difference between the upper lefthand pixel in the current block and the upper lefthand pixel in the upper half of the search window and stores this value in the accumulator. It then calculates the absolute value of the difference between the next pixel in the current block and the corresponding pixel in the search window and adds this value to the value previously stored in the accumulator. And it repeats this process for all the other pixels of the current block. As a result, the final value in the accumulator is the sum of the absolute value of the differences between the pixels of the current block and the pixels of the block in the upper lefthand corner of the search window.

Meanwhile, the data streams and the band select signals SUB, SLB received at the first processing unit are also passed on the second processing unit. If there were no change in the temporal relationships among the data streams, the second processing unit would perform the same calculations on the same data as the first processing unit and would simply duplicate its result. However, in accordance with the invention, a one pixel delay is introduced into the SUB signal and into the data stream from the current block.. This has the effect of displacing by one pixel row the location of the block in the search window that is to be matched against the current block. The matching process proceeds exactly as in the case of the first processing unit starting with the pixels in the upper lefthand corner of the current block and the block of the search window.

In like fashion,-the data stream from the current block is delayed by one pixel at each processing unit, each time displacing the block in the search window of the next comparison by one pixel row. Each time the bottom of the search window is reached, the search window block for the next comparison is shifted one column to the right and the comparison is resumed at the top of the search window. As a result, the last processing unit compares the current block with the block in the lower righthand corner of the search window.

Preferably, the number of pixels in a block is the same as the number of search blocks and the number of processing units. In such preferred embodiment, the SUB signal and the intensity data for the first pixel of the current block reach the last processing unit at the same time as the last pixels of the current block and the upper and lower search windows enter the first processing unit.

After the last pixels are provided to the first processing unit and the results of their comparison are stored in the accumulator, the EOB signal is also provided to the first processing unit. This signal reads out the low byte (ELOB) of the final error value stored in the accumulator of the first processing unit and then reads out the high byte (EHOB) of the final error value. Each byte is read onto a separate line which passes through the processing units of the array to the comparison circuitry for detecting the best match. The read out of the EHOB signal is delayed one pixel relative to the read out of the ELOB signal by delaying the EOB signal. The delayed EOB signal is then provided to the next processing unit. As a result of this arrangement, the EOB advances through the array of processing units at the same speed as the last pixel of the current block. And as a consequence of this, the upper and lower bytes of the final error values appear in order at the outputs of the last processing unit of the array at the same rate as the last pixel advances through the array.

Advantageously, a new motion-estimation calculation for a new current block can begin as soon as the EOB signal begins to read out the final error values. In particular, an SOB signal and bit-serial data representative of the pixels of the next current block and the upper and lower halves of the next search window can be provided to the first processing unit as soon as the EOB signal reads the final error value out of the accumulator of the first processing unit.

The foregoing process can be implemented in many ways. Since speed is of paramount consideration, special-purpose circuitry is preferred. Especially advantageous are field-programmable gate arrays such as the CLi 6000 supplied by the assignee of the present application.

BRIEF DESCRIPTION OF THE DRAWINGS

These and other objects, features, and advantages of the present invention are described in the following description of the preferred embodiment in which.

DETAILED DESCRIPTION OF THE PREFERRED EMBODIMENT

The preferred embodiment of the invention is a method and apparatus for the estimation of motion between successive frames of video data and the invention will be described in detail in such context. The application of the invention in other contexts will be apparent from the description.

Figure 1:
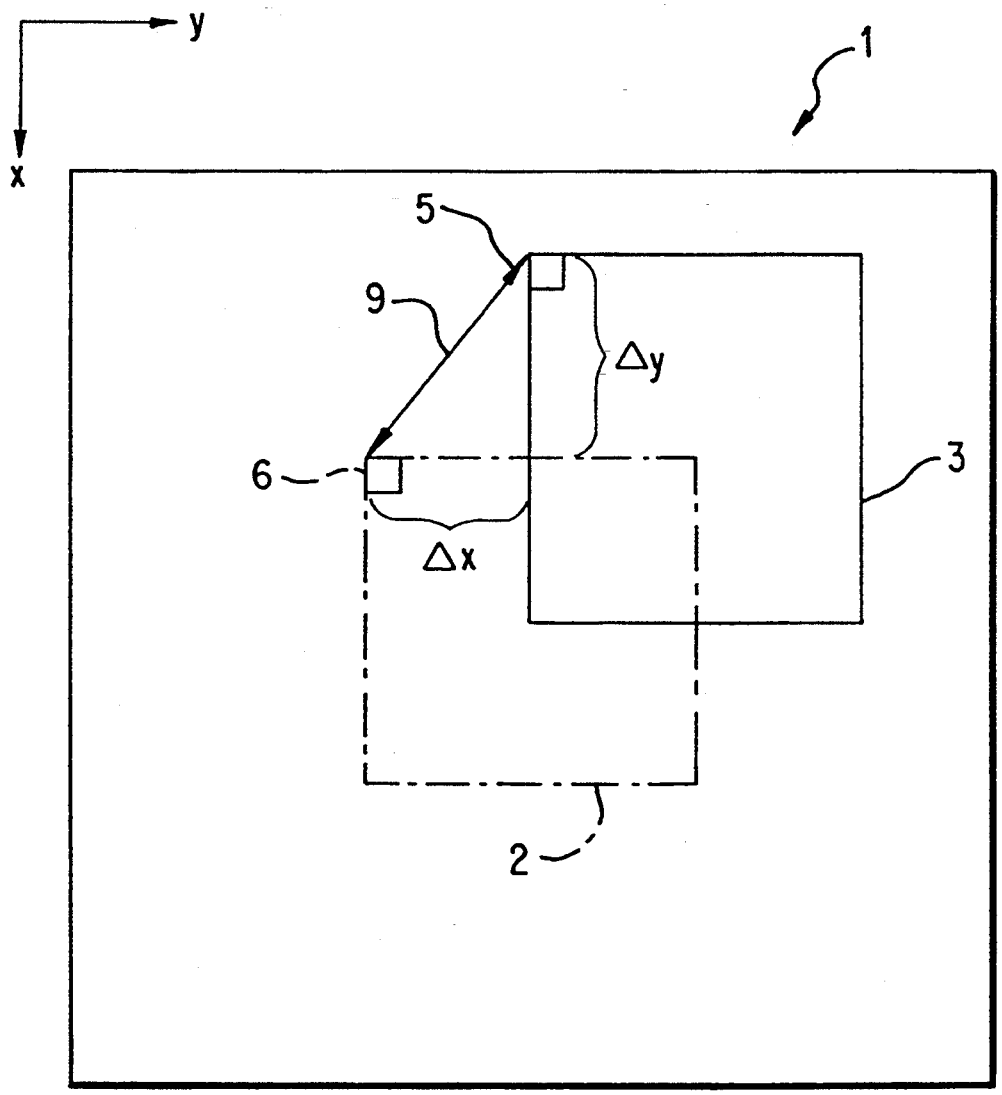
FIG. 1 is an example illustrating a search window of a previous frame and a corresponding current block of a current frame.

FIG. 1 illustrates a search window 1 of the previous frame and a corresponding current block 2 of the current frame. Illustratively, one of the search blocks of the search window is depicted as 3. The search block 3 is offset from the current block 2 by $\Delta x$ horizontally and $\Delta y$ vertically. Thus, a displacement vector 9 of the search block 3 with respect to the current block 2 is $(\Delta x, \Delta y)$.

In the following discussion, each block is referred to by the coordinates of a pixel at the upper left-hand corner, and the coordinate system is selected as illustrated by arrows 8. Accordingly, current block 2 is described as located at pixel 6 and search block 3 is described at located at pixel 5. If (x,y) is the location of block 2 in the coordinate system, then $(x+\Delta x, y+\Delta y)$ is the location of block 3.

The error between a current block 2 located at (x,y) and a search block that is displaced by $(\Delta x, \Delta y)$ relative to the current block is determined using the following formula:

$$\text{Error}(\Delta x, \Delta y) = \sum_{x=0}^{X-1} \sum_{y=0}^{Y-1} |c(x,y) - P(x+\Delta x, y+\Delta y)| \qquad (1)$$

where C(x,y) designates an intensity value of a current block pixel at (x,y) and $P(x+\Delta x, y+\Delta y)$ designates an intensity value of the corresponding pixel of the search block; and X and Y are, respectively, the horizontal and vertical dimensions in pixels of the blocks being compared. As will be apparent, equation (1) sums the absolute value of the difference in intensity at each pixel (x,y) in the two blocks.

The motion estimation method of this invention determines both the displacement vector $(\Delta x, \Delta y)$ and Error$(\Delta x, \Delta y)$ of the best match. More specifically, Error $(\Delta x, \Delta y)$ is computed for each search block of a given search window; and the search block for which the error is smallest is selected as the best match. This computation is repeated for each current block in the current frame, which is assumed to be tiled with current blocks (except for an indentation around the edges of the frame as explained below).

In the preferred embodiment, the current blocks are 16×16-pixel squares and the search windows are 31×31-pixel squares. Accordingly, there are 256 different 16×16-pixel search blocks within each search window. Thus, to determine the error between the pixels of a current block and those of one search block, 256 computations must be made of the absolute value of the difference in intensity between each corresponding pair of pixels in the two blocks; and to determine the best match for a given current block within the corresponding search window the computations according to the formula (1) have to be repeated 256 times.

The motion estimation apparatus described below can be generally characterized as a bit-serial synchronous system. The term bit-serial refers to the fact that digital signals representing bits of data enter the inputs of the system sequentially rather than in parallel. Alternatively, the invention may be practiced using a bit-parallel organization of the data. The system is synchronous because all the communications and computations are performed in response to a global clock rate. The global clock rate is adjusted such that one bit of input data is supplied per clock period (or clock cycle). Since each pixel is represented by a byte of data, it takes eight clock periods to transmit serial data corresponding to a single pixel.

Figure 2:
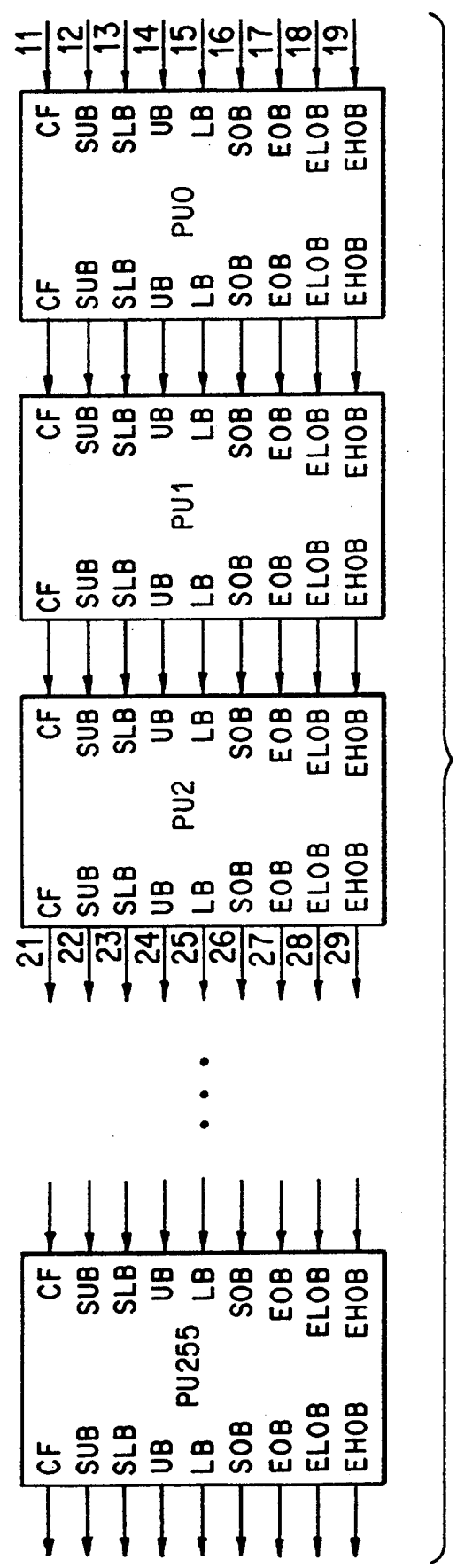
FIG. 2 is a schematic illustration of a linear array of processing units employed for motion estimation.

The present invention is implemented using a linear array of two hundred and fifty six (256) substantially identical processing units illustrated in FIG. 2. The processing units are labeled PU0 to PU255 in sequence. Each processing unit of the array is dedicated to determining the error between the pixels of the current block and the pixels of a different one of the 256 search blocks of the search window.

The array receives continuous bit-serial streams of data representing the pixels of the current and previous frames and the output of the array is a continuous stream of error values. The computations are performed by the processing units in parallel and pipelined fashion, such that a given processing unit outputs the computed error values essentially immediately (or separated by a short delay) after the output of computed error values from the preceding processing unit.

Each processing unit has nine inputs, current frame (CF) 11, select upper band (SUB) 12, select lower band (SLB) 13, upper band (UB) 14, lower band (LB) 15, start of block (SOB) 16, end of block (EOB) 17, error low order byte (ELOB) 18, and error high order byte (EHOB) 19. For each of those inputs there is a corresponding output similarly labelled and numbered from 21 to 29. The processing units are connected such that the outputs of any given unit are ordinarily connected to the matching inputs of the next unit in the array.

Figure 3B:
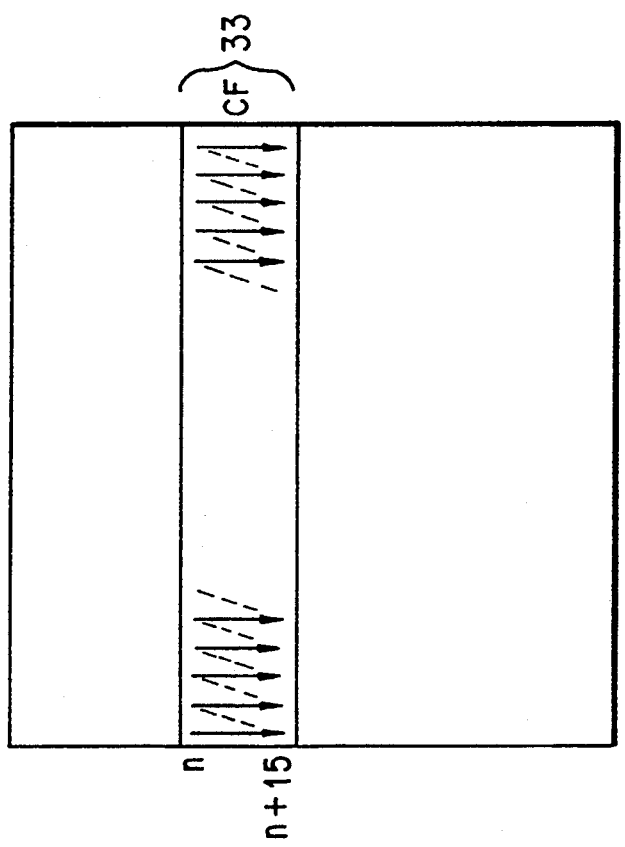
FIGS. 3(a)-(b) are schematic illustrations depicting the ordering of pixels transmitted to the array.
Figure 3A:
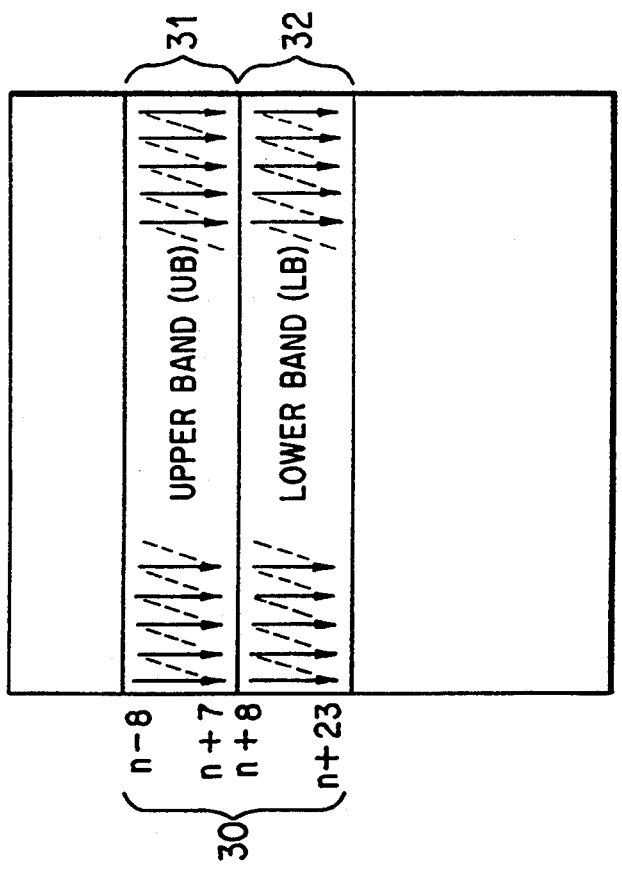

The pixels of the current frame and of the upper and lower bands of the previous frame are provided to the array inputs CF 11, UB 14 and LB 15 in the patterns shown in FIGS. 3(a) and 3(b). FIG. 3(a) illustrates a 32-pixel-high band 30 of the previous frame pixels comprising two 16-pixel-high half bands, an upper half band 31 and a lower half band 32, that are provided in bit-serial fashion to the upper band and lower band inputs UB 14 and LB 15 respectively of the first processing unit. During the computational process, these signals propagate through the array over the connected UB and LB inputs and outputs. FIG. 3(b) illustrates a 16-pixel-high band 33 of the current frame pixels which enter the array in bit-serial fashion at current band input CF 11. As illustrated, the upper band is offset vertically from the current band by −8 pixels and the lower band is offset from the current band by +8 pixels. In other words, the current band "overlaps" the upper and lower bands by eight pixels.

The order in which signals representing the pixels of each of these three bands enter their corresponding inputs is the same as shown in FIGS. 3(a) and 3(b). In particular, the pixels are scanned beginning at the top of the lefthand column and proceeding down that column to the bottom and continuing at the top of the next column to the right. The scanning of these three bands starts at the same time.

Figure 4B:
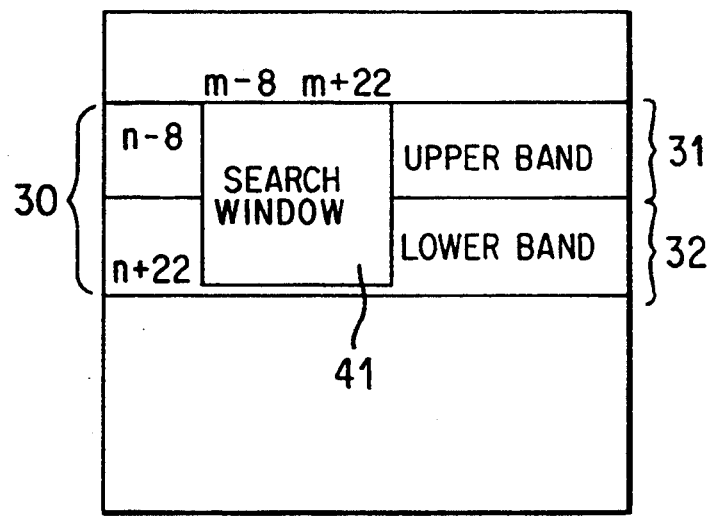
FIGS. 4(a)-(b) are schematic illustrations depicting the search window comprising upper-band and lower-band input pixels, and the current block comprising current-band input pixels.
Figure 4A:
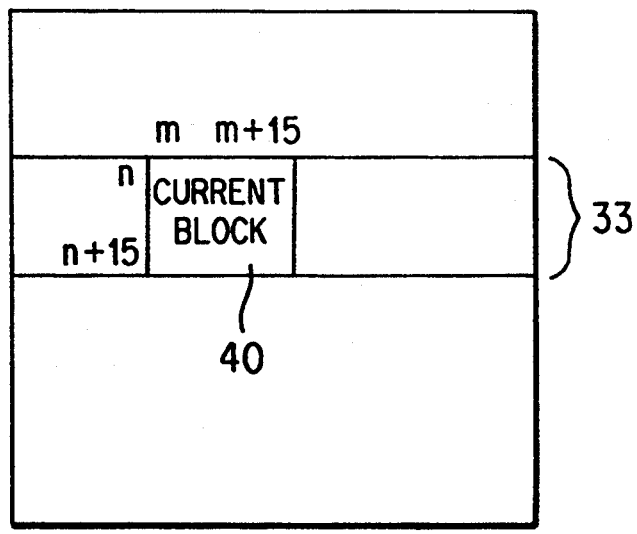

As indicated above, motion estimation is performed by comparing a block in the current frame with a set of blocks in a search window in the previous frame. FIG. 4(a) illustrates a 16×16 pixel current block 40 defined within the current band 33, and FIG. 4(b) illustrates the corresponding search window 41 of the previous frame. The search window 41 is a 31×31 square of pixels and, thus, it does not include the bottom row of pixels of the lower band. As indicated previously, the 31×31-pixel search window 41 accommodates exactly 256 different 16×16-pixel search blocks.

Figure 5:
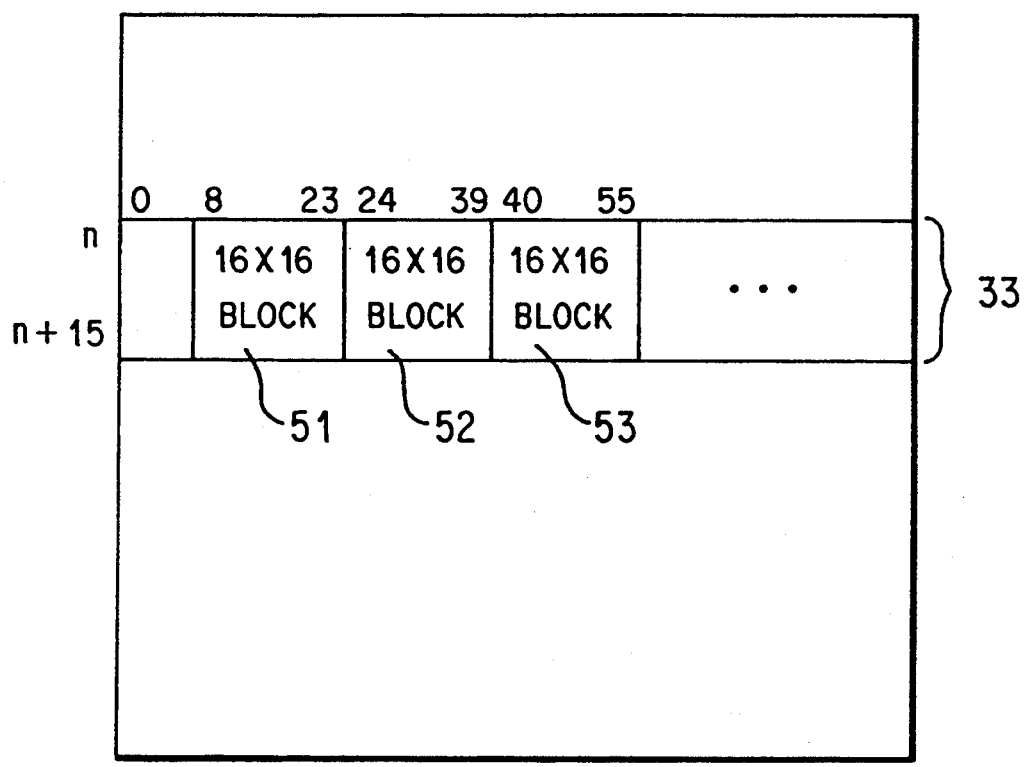
FIG. 5 is a schematic illustration of the current blocks that abut each other.

FIG. 5 illustrates a sequence of current blocks (51, 52, 53) defined within the current band 33. In this illustration, the current blocks abut each other so that the sixteenth column of pixels of a given current block is followed by the first column of the next current block. Generally, the current blocks need not abut and they do not overlap.

The search windows of the preceding frame are defined such that each window extends eight pixels in the horizontal and vertical directions from the top left-hand corner of the associated current block. Accordingly, as illustrated in FIG. 5, the first current block 51 is located at least eight columns from the left-hand boundary of the current frame to have a proper offset with respect to the corresponding search window of the previous frame. For the same reason, the last current block of the current band is also indented by at least eight columns from the right hand boundary of the current frame.

Additional signals provided to the linear array of FIG. 2 include a start of block (SOB) signal, an end of block (EOB) signal, error high order byte (EHOB) and error low order byte (ELOB) signals, select upper band (SUB) and select lower band (SLB). The start of block signal, provided at SOB inputs 16, indicates the beginning of each new current block of data entering the array. More specifically, this signal has an active high value that coincides in time with the first 8-bit pixel transmitted for each new current block. This signal is used to reset an accumulator (see FIG. 9) in each processing unit. Since, in the preferred embodiment, the current blocks abut each other, the start of block signal is preferably provided every 2048 clock cycles, which is the minimum time required for serial entry of 256 pixels (2048 bits) and read out of the final error values. In an embodiment in which the current blocks do not abut, the period between the start of block signals is longer to skip the pixels between the last and first columns of adjacent current blocks.

The end of block signal, provided at EOB inputs 17, is the start of block signal delayed by the time required for serial entry of 256 pixels and computation of the associated error value. The active value of each EOB signal immediately follows the last input pixel of each current block and in the preferred embodiment of the invention immediately precedes the next SOB signal. The EOB signal is used to read out the error values stored in the accumulator of each processing unit.

Error low order byte (ELOB) and error high order byte (EHOB) inputs 18 and 19 and outputs 28 and 29 form busses that propagate through the array the final error values computed by and read out from each processing unit. The ELOB inputs 18 and outputs 28 are provided for the less significant byte of the error value and EHOB inputs 19 and outputs 29 are provided for the more significant byte.

The select upper band and select lower band signals provided at inputs 12 and 13 are used to control latches in the processing units which select upper band data or lower band data for use in computing error values.

Figure 6:
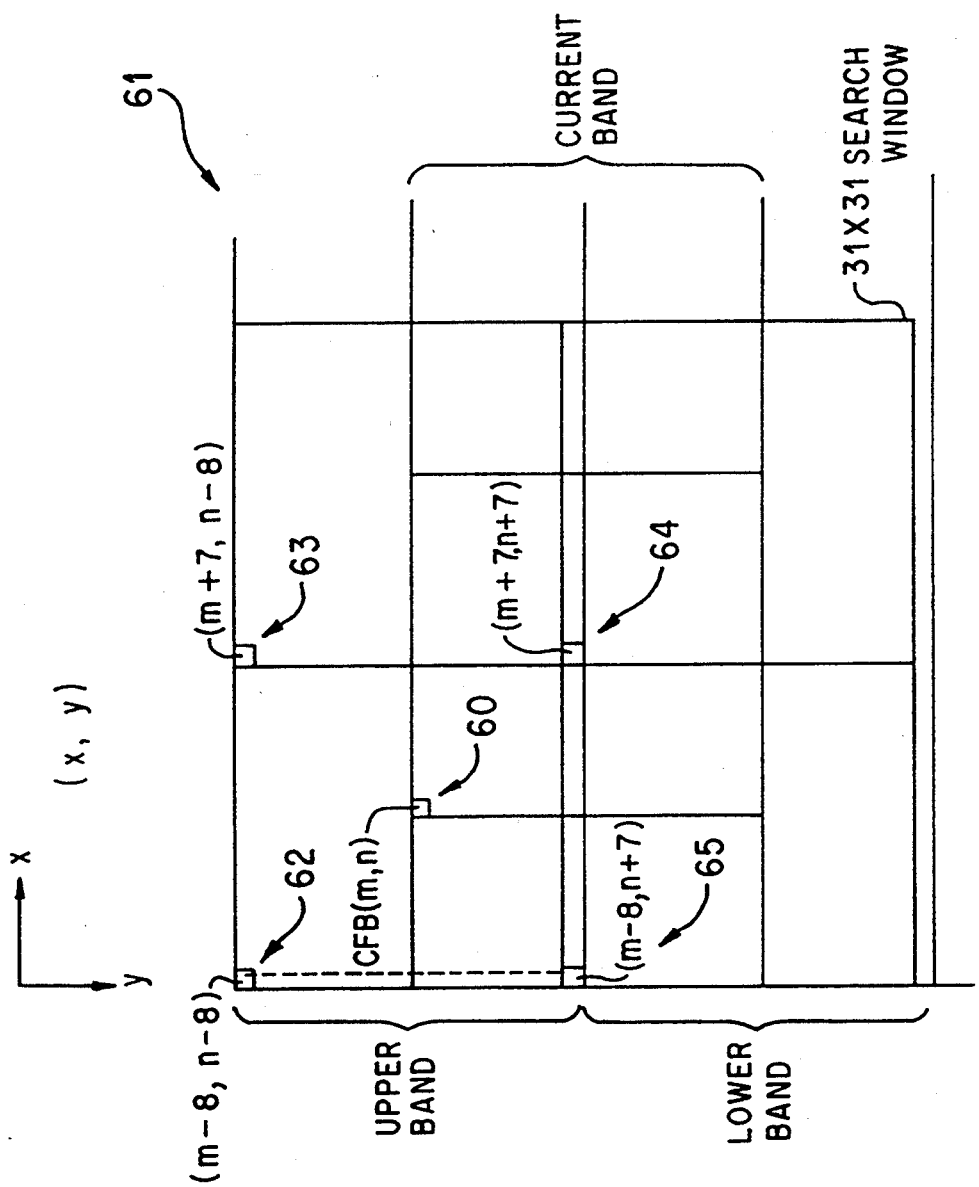
FIG. 6 is a schematic illustration of the current block, the corresponding search window, and the selected search blocks of the search window.

As discussed previously, each processing unit computes the error between the pixels of the 16×16-pixel current block and one of the 256 different search blocks of the same size located within the 31×31-pixel search window. FIG. 6 illustrates the current block 60, the corresponding search window 61, and search blocks 62, 63, 64 and 65. As discussed previously, each block is uniquely identified by the coordinates of the upper left corner. For a current block 60 with the upper left corner at (m,n), the 256 search blocks are contained in the region bounded by the search blocks (m−8, n−8), (m+7, n−8), (m+7, n+7), (m−8, n+7) which are shown as 62, 63, 64 and 65, respectively. For simplicity, in further discussion the search blocks within a search window are designated by the offset of the upper left-hand corner pixel with respect to the upper left-hand corner of the corresponding current block. For example, the search blocks 62, 63, 64 and 65 of FIG. 6 are designated as (−8,−8), (+7,−8), (+7,+7) and (−8,+7), respectively. In other words, the upper left corner of the search block that coincides with the current block is selected as the (0,0) origin for the blocks of the same search window. Using this notation, the search block identifier is the same as the corresponding displacement vector.

Table I below illustrates the assignment of the processing units to the Search blocks. The columns designated as P# list the numbers of the processing units as they appear in the array, i.e., 0 designates the first unit PU0 in the array, 255 designates the last unit. The columns designated as Search Block indicate the search blocks, using the notation described above, for which the error value is determined by the corresponding processing units.

TABLE I

| Processing Units & Associated Displacements | | | |
|---|---|---|---|
| P# Search Block | P# Search Block | P# Search Block | P# Search Block |
| 0 - (−8,−8) | 64 - (−4,−8) | 128 - (+0,−8) | 192 - (+4,−8) |
| 1 - (−8,−7) | 65 - (−4,−7) | 129 - (+0,−7) | 193 - (+4,−7) |
| 2 - (−8,−6) | 66 - (−4,−6) | 130 - (+0,−6) | 194 - (+4,−6) |
| 3 - (−8,−5) | 67 - (−4,−5) | 131 - (+0,−5) | 195 - (+4,−5) |
| 4 - (−8,−4) | 68 - (−4,−4) | 132 - (+0,−4) | 196 - (+4,−4) |
| 5 - (−8,−3) | 69 - (−4,−3) | 133 - (+0,−3) | 197 - (+4,−3) |
| 6 - (−8,−2) | 70 - (−4,−2) | 134 - (+0,−2) | 198 - (+4,−2) |
| 7 - (−8,−1) | 71 - (−4,−1) | 135 - (+0,−1) | 199 - (+4,−1) |
| 8 - (−8,+0) | 72 - (−4,+0) | 136 - (+0,+0) | 200 - (+4,+0) |
| 9 - (−8,+1) | 73 - (−4,+1) | 137 - (+0,+1) | 201 - (+4,+1) |
| 10 - (−8,+2) | 74 - (−4,+2) | 138 - (+0,+2) | 202 - (+4,+2) |
| 11 - (−8,+3) | 75 - (−4,+3) | 139 - (+0,+3) | 203 - (+4,+3) |
| 12 - (−8,+4) | 76 - (−4,+4) | 140 - (+0,+4) | 204 - (+4,+4) |
| 13 - (−8,+5) | 77 - (−4,+5) | 141 - (+0,+5) | 205 - (+4,+5) |
| 14 - (−8,+6) | 78 - (−4,+6) | 142 - (+0,+6) | 206 - (+4,+6) |
| 15 - (−8,+7) | 79 - (−4,+7) | 143 - (+0,+7) | 207 - (+4,+7) |
| 16 - (−7,−8) | 80 - (−3,−8) | 144 - (+1,−8) | 208 - (+5,−8) |
| 17 - (−7,−7) | 81 - (−3,−7) | 145 - (+1,−7) | 209 - (+5,−7) |
| 18 - (−7,−6) | 82 - (−3,−6) | 146 - (+1,−6) | 210 - (+5,−6) |
| 19 - (−7,−50) | 83 - (−3,−5) | 147 - (+1,−5) | 211 - (+5,−5) |
| 20 - (−7,−4) | 84 - (−3,−4) | 148 - (+1,−4) | 212 - (+5,−4) |
| 21 - (−7,−3) | 85 - (−3,−3) | 149 - (+1,−3) | 213 - (+5,−3) |
| 22 - (−7,−2) | 86 - (−3,−2) | 150 - (+1,−2) | 214 - (+5,−2) |
| 23 - (−7,−1) | 87 - (−3,−2) | 151 - (+1,−1) | 215 - (+5,−1) |
| 24 - (−7,+0) | 88 - (−3,+0) | 152 - (+1,+0) | 216 - (+5,+0) |
| 25 - (−7,+1) | 89 - (−3,+1) | 153 - (+1,+1) | 217 - (+5,+1) |
| 26 - (−7,+2) | 90 - (−3,+2) | 154 - (+1,+2) | 218 - (+5,+2) |
| 27 - (−7,+3) | 91 - (−3,+3) | 155 - (+1,+3) | 219 - (+5,+3) |
| 28 - (−7,+4) | 92 - (−3,+4) | 156 - (+1,+4) | 220 - (+5,+4) |
| 29 - (−7,+5) | 93 - (−3,+5) | 157 - (+1,+5) | 221 - (+5,+5) |
| 30 - (−7,+6) | 94 - (−3,+6) | 158 - (+1,+6) | 222 - (+5,+6) |
| 31 - (−7,+7) | 95 - (−3,+7) | 159 - (+1,+7) | 223 - (+5,+7) |
| 32 - (−6,−8) | 96 - (−2,−8) | 160 - (+2,−8) | 224 - (+6,−8) |
| 33 - (−6,−7) | 97 - (−2,−7) | 161 - (+2,−7) | 225 - (+6,−7) |
| 34 - (−6,−6) | 98 - (−2,−6) | 162 - (+2,−6) | 226 - (+6,−6) |
| 35 - (−6,−5) | 99 - (−2,−5) | 163 - (+2,−5) | 227 - (+6,−5) |
| 36 - (−6,−4) | 100 - (−2,−4) | 164 - (+2,−4) | 228 - (+6,−4) |
| 37 - (−6,−3) | 101 - (−2,−3) | 165 - (+2,−3) | 229 - (+6,−3) |
| 38 - (−6,−2) | 102 - (−2,−2) | 166 - (+2,−2) | 230 - (+6,−2) |
| 39 - (−6,−1) | 103 - (−2,−1) | 167 - (+2,−1) | 231 - (+6,−1) |
| 40 - (−6,+0) | 104 - (−2,+0) | 168 - (+2,+0) | 232 - (+6,+0) |
| 41 - (−6,+1) | 105 - (−2,+1) | 169 - (+2,+1) | 233 - (+6,+1) |
| 42 - (−6,+2) | 106 - (−2,+2) | 170 - (+2,+2) | 234 - (+6,+2) |
| 43 - (−6,+3) | 107 - (−2,+3) | 171 - (+2,+3) | 235 - (+6,+3) |
| 44 - (−6,+4) | 108 - (−2,+4) | 172 - (+2,+4) | 236 - (+6,+4) |
| 45 - (−6,+5) | 109 - (−2,+5) | 173 - (+2,+5) | 237 - (+6,+5) |
| 46 - (−6,+6) | 110 - (−2,+6) | 174 - (+2,+6) | 238 - (+6,+6) |
| 47 - (−6,+7) | 111 - (−2,+7) | 175 - (+2,+7) | 239 - (+6,+7) |
| 48 - (−5,−8) | 112 - (−1,−8) | 176 - (+3,−8) | 240 - (+7,−8) |
| 49 - (−5,−7) | 113 - (−1,−7) | 177 - (+3,−7) | 241 - (+7,−7) |
| 50 - (−5,−6) | 114 - (−1,−6) | 178 - (+3,−6) | 242 - (+7,−6) |
| 51 - (−5,−5) | 115 - (−1,−5) | 179 - (+3,−5) | 243 - (+7,−5) |
| 52 - (−5,−4) | 116 - (−1,−4) | 180 - (+3,−4) | 244 - (+7,−4) |
| 53 - (−5,−3) | 117 - (−1,−3) | 181 - (+3,−3) | 245 - (+7,−3) |
| 54 - (−5,−2) | 118 - (−1,−2) | 182 - (+3,−2) | 246 - (+7,−2) |
| 55 - (−5,−1) | 119 - (−1,−1) | 183 - (+3,−1) | 247 - (+7,−1) |
| 56 - (−5,+0) | 120 - (−1,+0) | 184 - (+3,+0) | 248 - (+7,+0) |
| 57 - (−5,+1) | 121 - (−1,+1) | 185 - (+3,+1) | 249 - (+7,+1) |
| 58 - (−5,+2) | 122 - (−1,+2) | 186 - (+3,+2) | 250 - (+7,+2) |
| 59 - (−5,+3) | 123 - (−1,+3) | 187 - (+3,+3) | 251 - (+7,+3) |
| 60 - (−5,+4) | 124 - (−1,+4) | 188 - (+3,+4) | 252 - (+7,+4) |
| 61 - (−5,+5) | 125 - (−1,+5) | 189 - (+3,+5) | 253 - (+7,+5) |
| 62 - (−5,+6) | 126 - (−1,+6) | 190 - (+3,+6) | 254 - (+7,+6) |
| 63 - (−5,+7) | 127 - (−1,−7) | 191 - )+3,+7) | 255 - (+7,+7) |

It is apparent from the above table that the first sixteen processing units of the array compute the errors for the sixteen search blocks located at the leftmost boundary of the search window. Each of these sixteen search blocks is one row of pixels lower in the window than the preceding search block. The next sixteen processing units compute the errors for the sixteen search blocks that are removed by one column of pixels from the leftmost boundary of the search window, and so forth. In general, processing units n×16 to n×16+15 (n=0,1, ...,15) compute a vertical sequence of search blocks that are removed from the leftmost boundary of the search window by n columns of pixels.

As indicated, the array is designed to achieve both parallel and pipelined computation of the error values. This parallel and pipelined operation is made possible by stepping the received data streams through the array of processing units, by selecting appropriate data from the upper and lower band data streams for use in computing error values at each processing unit, by delaying the current frame data stream relative to the upper and lower band data streams, and by reading out the computed error values as the final computation is made. The means for providing this parallel and pipelined operation are referred to collectively as the synchronization means.

Figure 7:
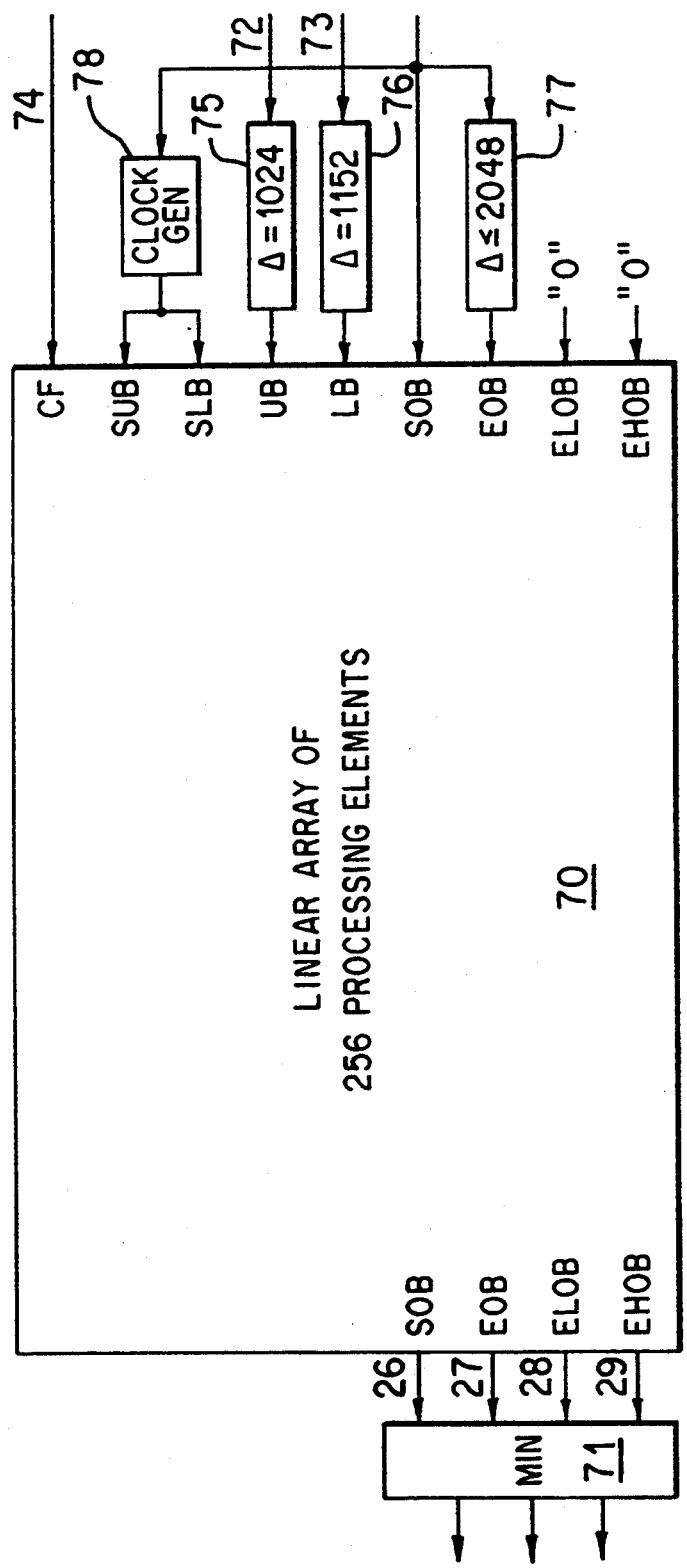
FIG. 7 is a schematic illustration of the motion-estimation apparatus of the present invention comprising the array of processing units, electronic components provided at the array inputs, and a minimal error module provided at the array outputs.

FIG. 7 depicts a block diagram of the motion estimation apparatus. The array of processing units is symbolically shown as array 70. The outputs 26, 27, 28 and 29 of the last processing unit serve as inputs to a minimum error module 71 which determines, for each current block, both the minimum error value among the error value outputs of the processing units and the displacement vector associated with the minimum error value.

As illustrated, various delays are introduced at the inputs to array 70. In addition to these delays, it should be noted that the streams of the preceding frame pixels arrive at inputs 72 and 73 synchronously with the current block input stream that arrives at input 74. This synchronization is achieved in part by delaying the previous frame signals by one frame. The means for introducing such a delay is within the skill of the art and not shown in this illustration.

Since each current block is indented by eight columns of pixels from the left boundary of the corresponding search window, the preceding frame upper and lower band inputs must also be delayed with respect to the current block input bit stream. In particular, delay means 75 delays the upper band input by 1,024 clock cycles corresponding to eight 16-pixel columns (128 pixels). Delay means 76 delays the preceding frame lower band input by 1152 clock cycles corresponding to nine 16-pixel columns. Thus, the lower input trails the upper input by one column of pixels. As explained subsequently, this delay permits synthesis of the inputs from the upper and lower band bit-streams to represent a proper search block for a given processing unit.

The end of block (EOB) signal is generated by delaying the start of block (SOB) signal by just under 2048 clock cycles using delay means 77. Clock generator 78 generates the select upper band (SUB) and select lower band (SLB) signals having eight-clock-cycle high values which coincide with the last pixel (i.e., the sixteenth pixel) of each column of the current block transmitted to the array. Clock generator 78 is synchronized by the start of block (SOB) signal.

Figure 8:
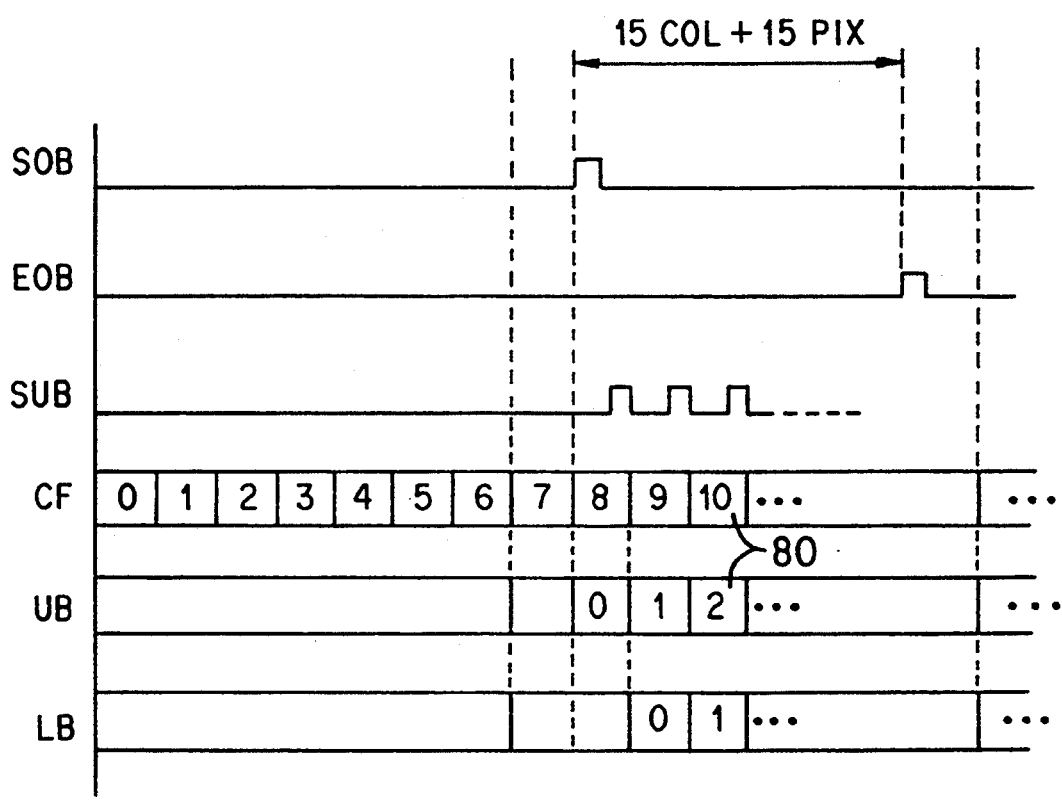
FIG. 8 is a timing diagram illustrating the relative timing of the signals entering the array.

The relative timing of the selected signals at the inputs to the array (i.e., to PUO) is illustrated, not to scale, in FIG. 8, in which the columns of pixels are designated by squares, such as 80. The columns are all numbered from the lefthand edge of the search window. Thus, for the current block, column 8 is the lefthandmost column of the current block. The input values at ELOB and EHOB inputs are immaterial at this point; these inputs are arbitrarily set to zero.

It should be noted that only four signals (UB, LB, CF and SOB) have to be provided to the motion estimation system illustrated in FIG. 7. It is within the ordinary skill in the art to generate in real time the appropriate UB, LB, and CF bit-streams from the video signal and to provide the start of block signals.

Figure 9:
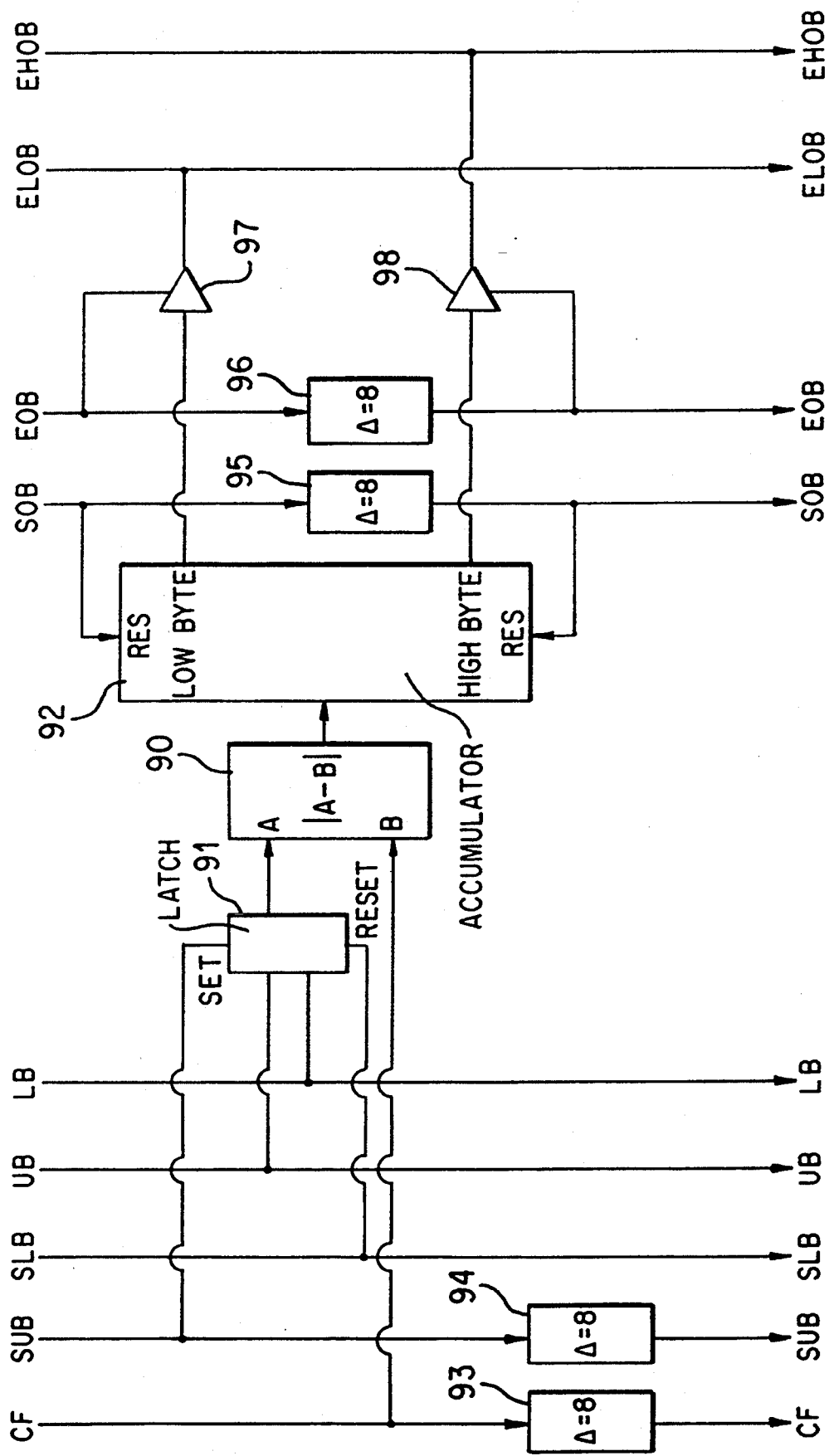
FIG. 9 is a block diagram of a typical processing unit of the array.

FIG. 9 is a schematic diagram which illustrates the operation of each processing unit. As shown, each processing unit comprises an absolute difference module 90, an accumulator 92 and delay means 93, 94, 95 and 96. In addition, all of the processing units except the first one of every set of sixteen (i.e., the first, seventeenth, thirty-third, etc. of the array) also includes a latch 91. In place of latch 91, the remaining processing units have a delay means (not shown) whose sole input is connected to the UB input. Latch 91 is operated essentially as a multiplexer so that it is set to pass signals from the UB input when set by the SUB signal and to pass signals from the LB input when reset by the SLB signal.

Absolute difference module 90 receives two bit serial streams of data as inputs. One input to module 90 is connected to the CF input 11, which receives the bit-stream that represents the pixels of the current block. Another input to module 90 is connected to the output of latch 91, or to the alternative delay means which receives the data that represents the pixels of the appropriate search block. Module 90 computes the absolute value of the difference between the bytes of input data that are supplied from the CB input and from the latch or delay means. As a result, it computes the difference between the intensity values of the corresponding pixels of two blocks. Each value computed by the module 90 is transmitted to accumulator 92 which adds the difference values. After all the signals representing the intensity of the pixels of the current block and the search block have been synchronously supplied to the corresponding inputs of a given processing unit and processed by the module 90, the accumulator 92 holds the total error value between the pixels of the current block and the pixels of the search block.

Delay means 93 adjusts the relative timing and content of the current frame and upper and lower band bit streams such that, at the outputs, the bit streams are aligned for the next processing unit to compare the current block to the next search block. This synchronization is accomplished by delaying the current frame (CF) and select upper band (SUB) signals relative to the upper and lower band bit streams. This synchronization mechanism is explained in further detail below.

Delay means 94 delays the select upper band signal relative to the select lower band signal. Since these signals affect the operation of latch 91, this has the effect of varying the output of latch 91 as described below.

Figure 10:
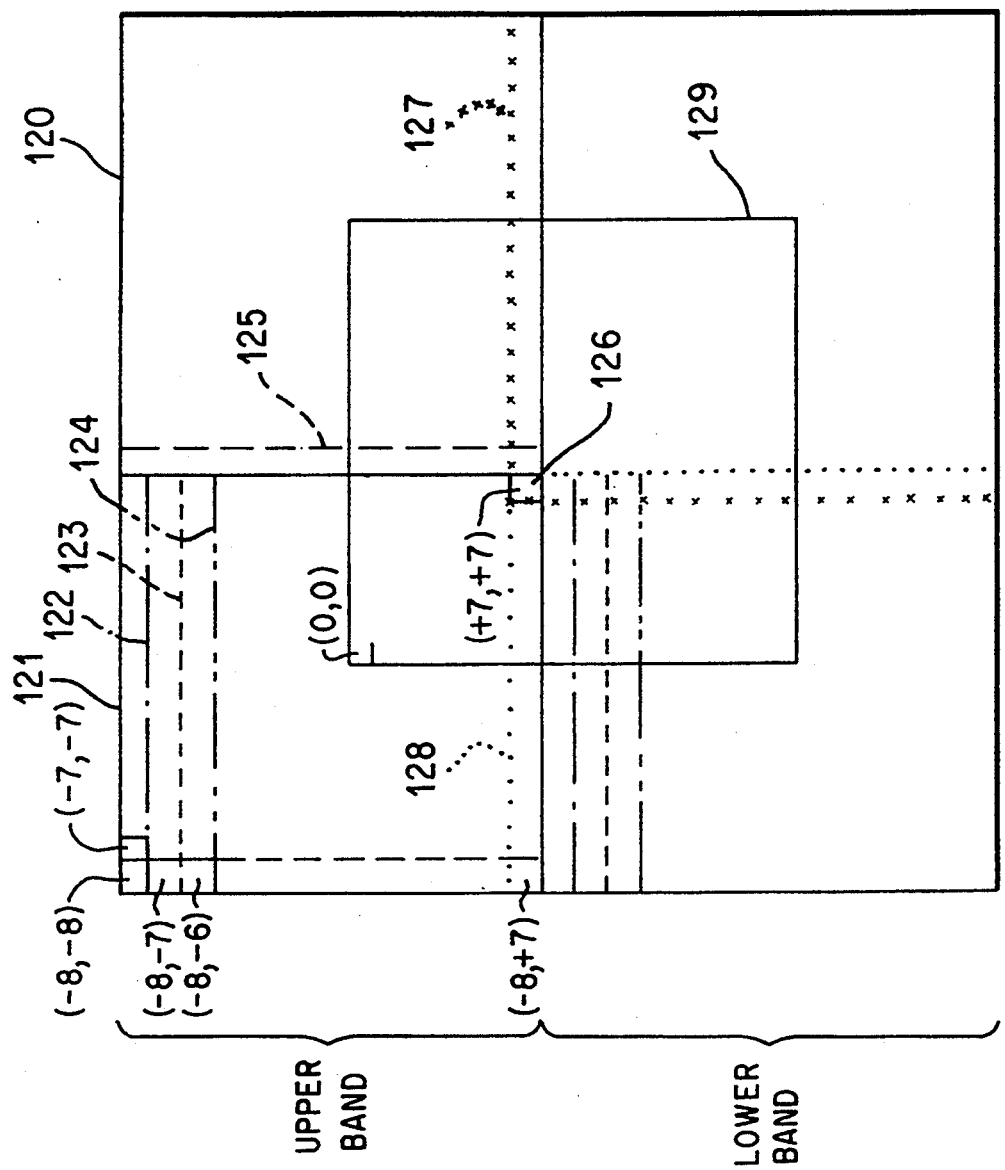
FIG. 10 is an example provided for explaining the synchronization mechanism of the array.
Figure 11:
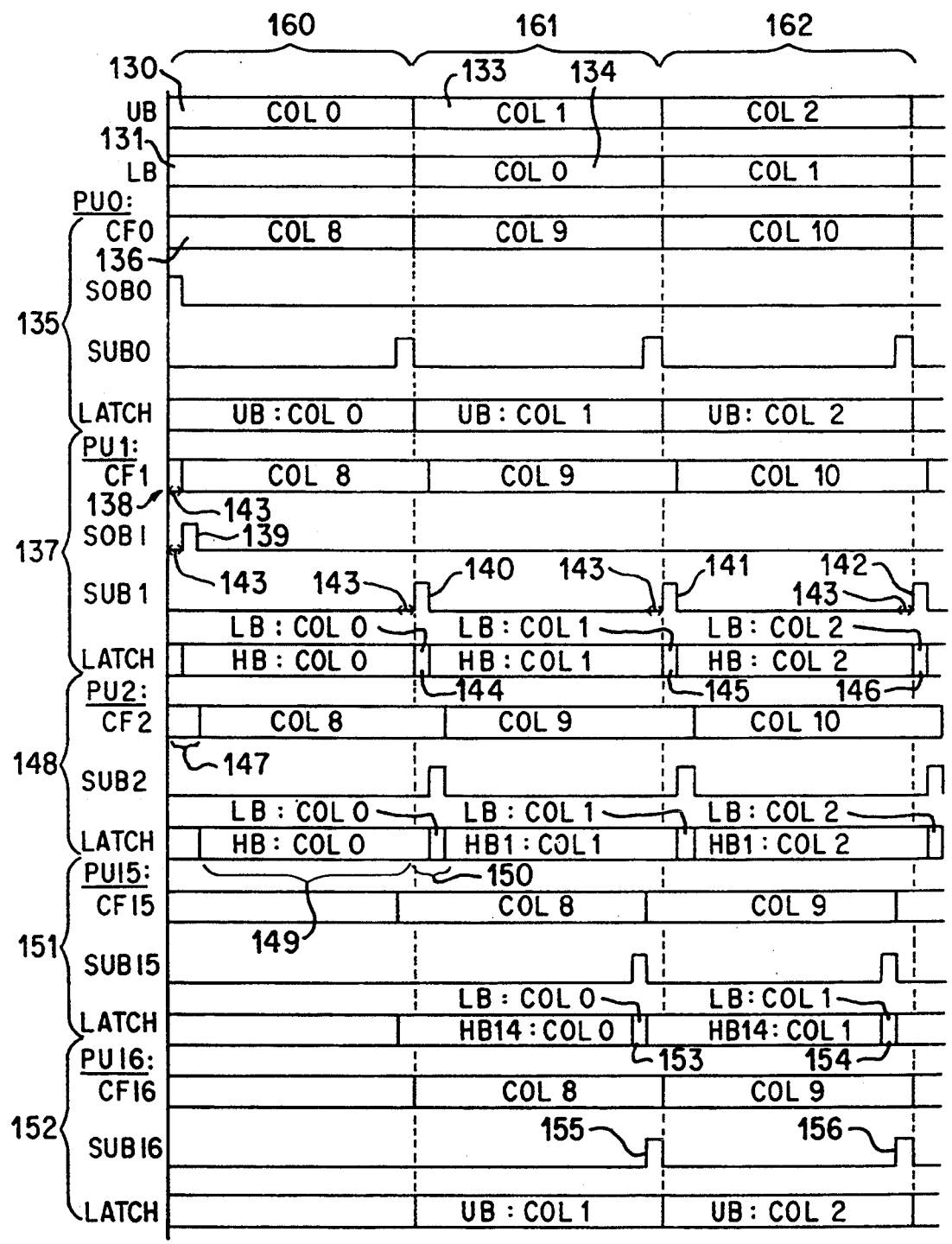
FIG. 11 is a timing diagram illustrating the relative timing of the selected signals entering the selected array elements.
Figure 12:
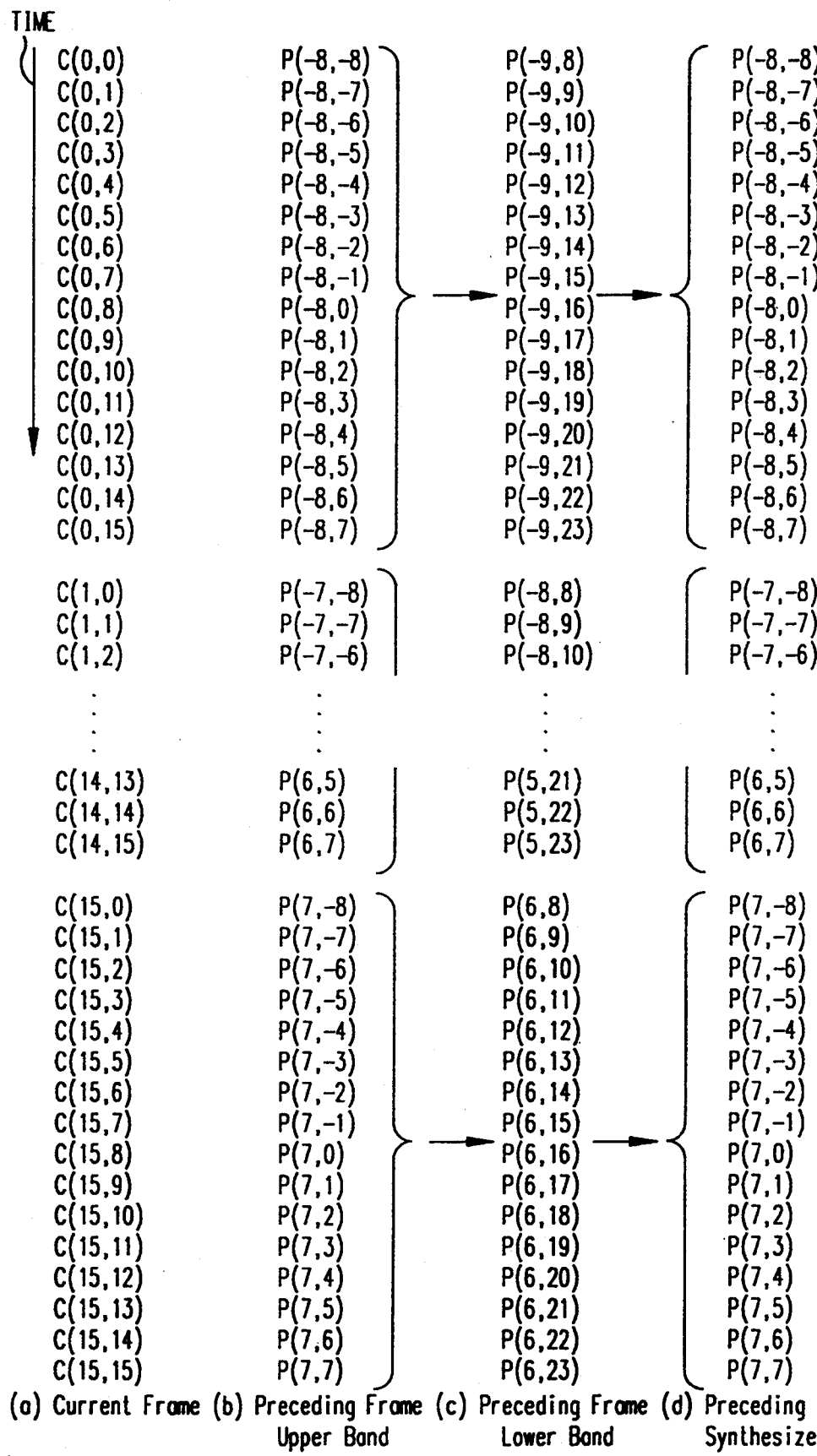
FIGS. 12-17 are tables illustrating the sequences of pixels transmitted to the upper band, the lower band, the hybrid band, and the current band inputs of the selected array elements.
Figure 13:
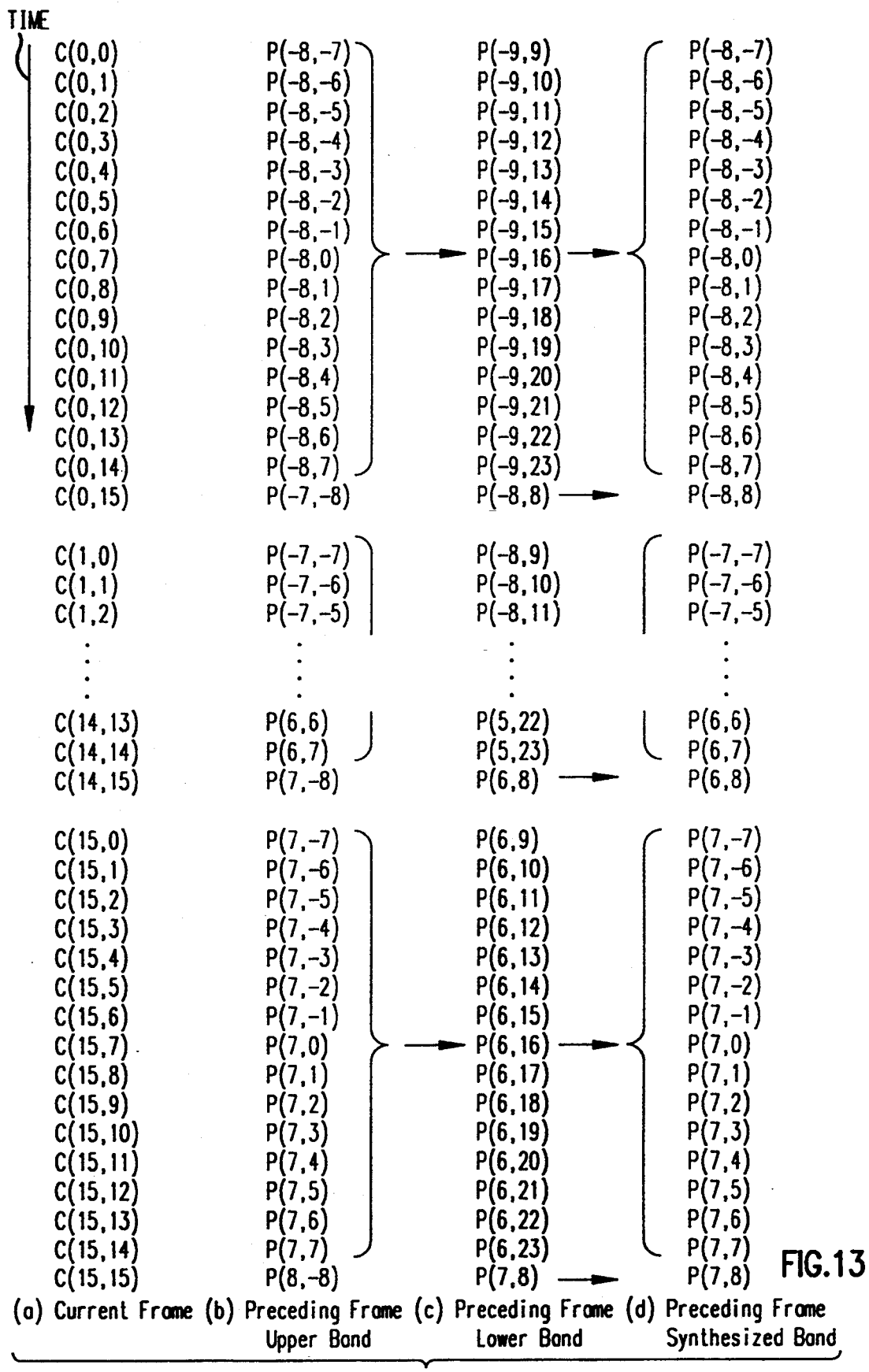
Figure 14:
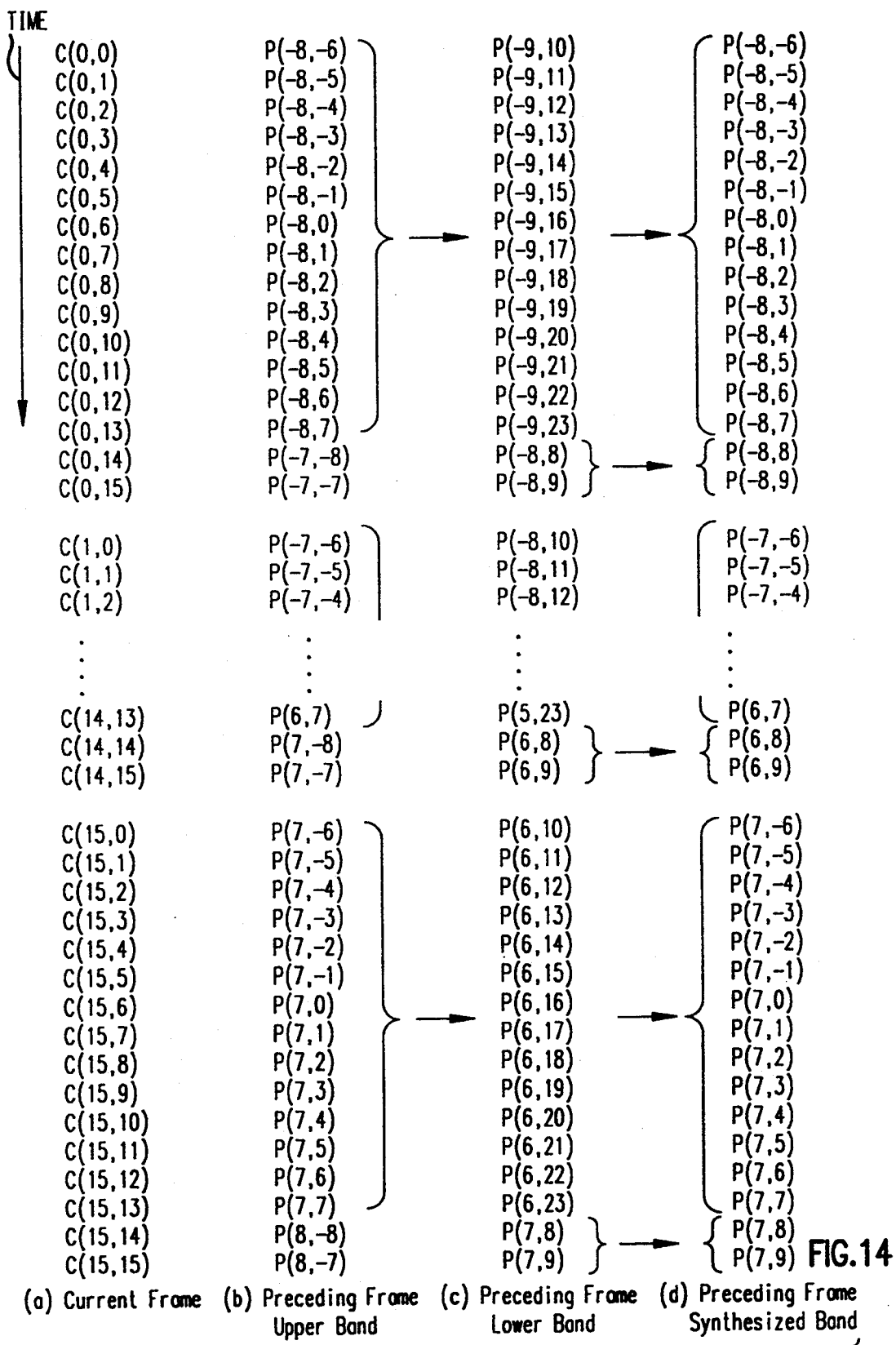
Figure 15:
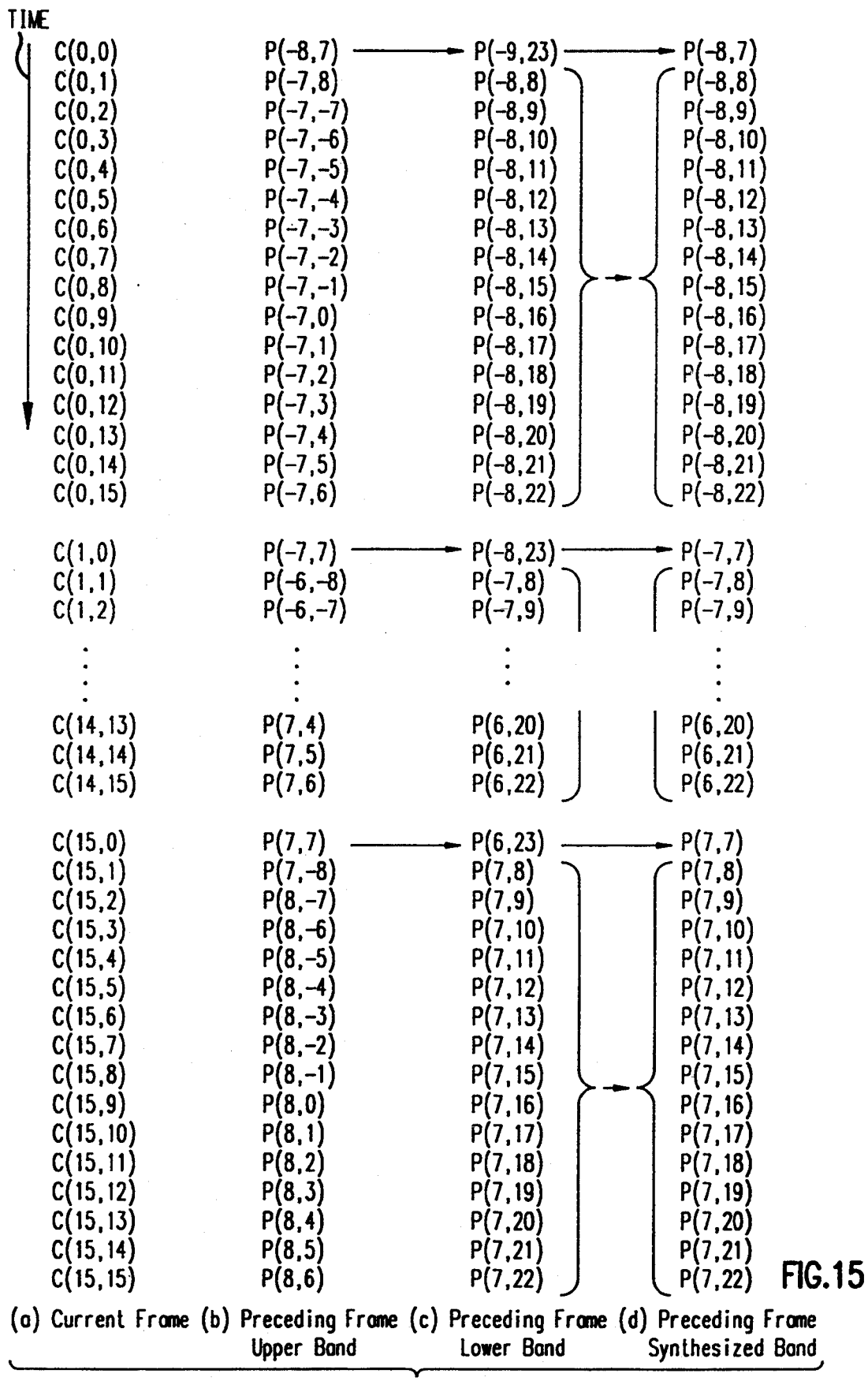
Figure 16:
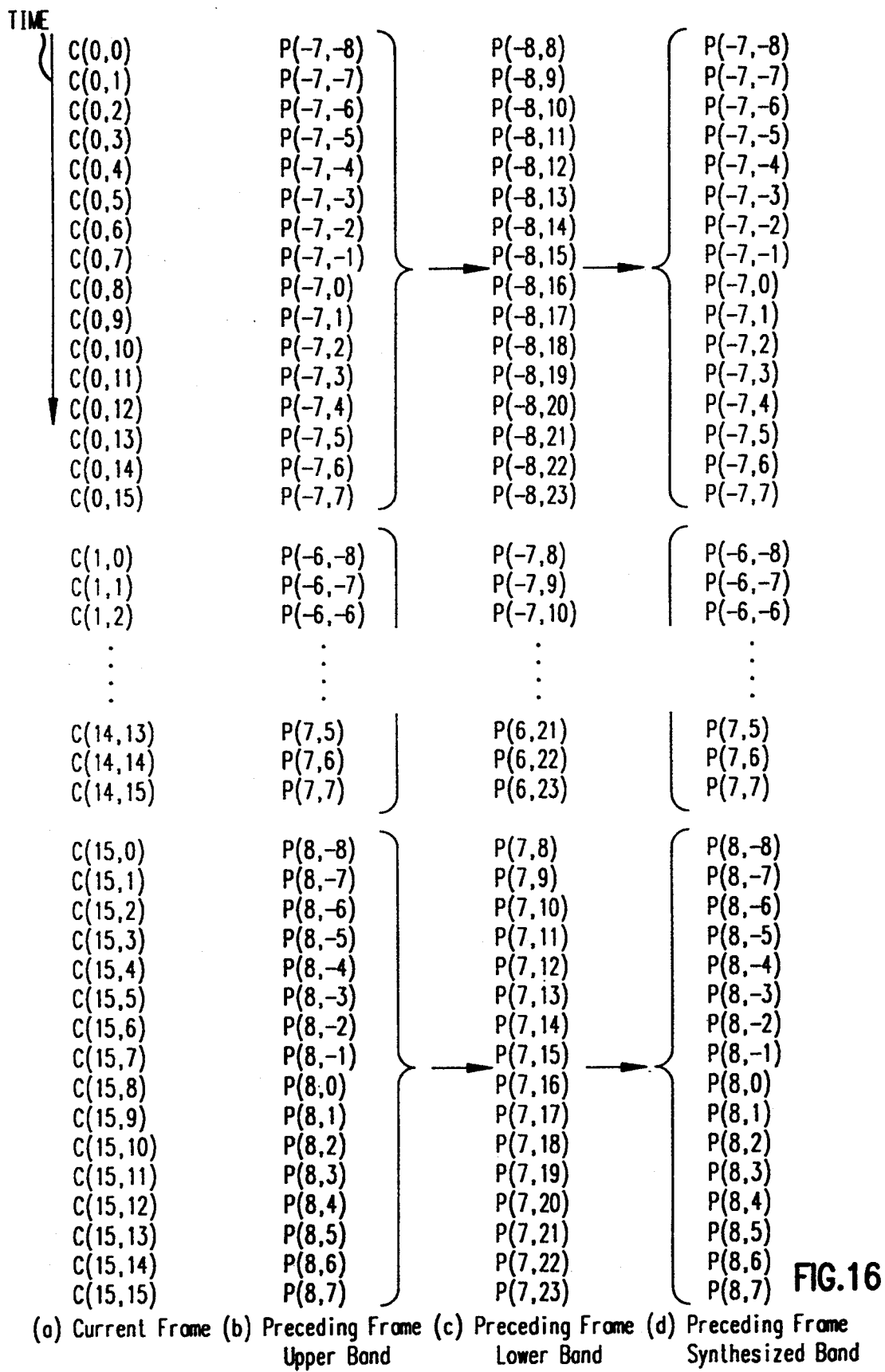

The alignment of the bit streams so that each processing unit computes the errors according to Table I above will be better understood from FIG. 10 and the timing diagram of FIG. 11.

The first processing unit PU0 computes the error between the current block 129 and the search block $(-8,-8)$ 121 in the search window 120 of FIG. 10. Note that the block 121 contains the pixels of the upper band only. Since the upper band is delayed by eight columns of pixels with respect to the current band input, the pixels of the search block $(-8,-8)$ are aligned in time with the corresponding current block pixels at the inputs to PU0. Thus, when the start of block signal occurs, PU0 starts computing the difference between the corresponding pixels of the current block and the search block $(-8,-8)$.

The next processing unit, PU1, computes the error between the current block 129 and the search block $(-8,-7)$, illustrated as 122. The search block $(-8,-7)$ consists of upper and lower band pixels. Thus, the input to PU1 must include pixels of both bands. More specifically, as can be seen in FIG. 10, to generate the proper input for the search blocks $(-8,-7)$, the top row of pixels of the upper band columns have to be removed and the top row of pixels of the lower band columns have to be inserted after the bottom pixels of the corresponding upper band columns. In other words, in the search block bit stream, the top pixel of a given lower band column n has to replace the top pixel of the upper band column n+1 (n is an integer).

Due to the eight-clock-cycle (1 pixel) relative delay introduced by the delay means 93 in the current frame bit stream at the output of PU0, the upper and lower band pixels are shifted forward in time by one pixel relative to the corresponding current frame pixels, so as to align the top pixels of the current block columns with the second pixels of the upper band columns. In addition, at latch 91, the SUB signal is delayed by eight clock periods by the delay means 94, relative to the SLB signal. As a result, with every sixteenth pixel, SLB resets the latch so as to select the lower band signals as its output. This causes every sixteenth upper band pixel, beginning with the seventeenth pixel, to be replaced by the lower band pixel available on the LB input. Since the lower band is "behind" the upper band by 16 pixels (one column), the seventeenth pixel of the upper band (the top pixel of the second upper band column) coincides in time with the top pixel of the lower band first column. Thus, in the output of latch 91, the bottom pixels of the upper band columns are followed by the top pixels of the corresponding lower band columns, which have replaced the top upper band pixels. In other words, the search block has "dropped down" one row relative to the block $(-8, -8)$.

Timing diagram of FIG. 11 provides a further illustration of the signal synchronization discussed above. The diagram represents the signal processing that occurs during the comparison of the first three columns of the current block with the first three columns of the search window. Each of columns 160, 161, 162 represents 128 clock cycles, 128 clock cycles being the time required to compare 16 sets of pixels. The initial columns of the upper and lower band input pixels are identified on lines 130 and 131 and the initial columns of the current block on line 136. Since the relative timing of the upper and lower bands does not change, these signals are shown only once for the processing units discussed in conjunction with FIG. 11. Due to the 16-pixel delay of the lower band with respect to the upper band, the first column 134 of the lower band coincides in time with the second column 133 of the upper band and, in general, a column n of the lower band coincides with a column n+1 of the upper band (n is an integer).

The other inputs to PU0, which are material to this discussion are illustrated at 135. Note that the timing for the upper band and latch outputs is identical and the current block bit stream 136 is delayed by eight columns with respect to the upper band signal.

The input bit streams to PU1, illustrated at 137, are generated by PU0 as described previously. The current block bit stream 138, the start of block signal 139, and the select upper band SUB signals 140, 141 and 142 are delayed by eight clock cycles with respect to the corresponding inputs to PU0. This delay is shown as distance 143. Also, in response to the delayed SUB signal, the top pixels 144, 145, 146 of the succeeding columns (starting with the second column) are replaced by the top lower band pixels (starting with the first lower band column).

For the third processing unit PU2, the latch output to module 90 has to represent the search block that is "moved" another row down, i.e., the search block (−8, −6) illustrated as 123 in FIG. 10. The latch output to module 90 is synthesized by PU1 in a similar manner. The current frame input is delayed by another pixel so that the first pixel of each of the current band columns is now aligned with each third pixel of the upper band columns in the upper band bit stream. In addition, each fifteenth and sixteenth pixel of the upper band bit stream, starting with the seventeenth pixel, is replaced by the first and second pixels of the lower band columns. The timing diagram of FIG. 11 illustrates the inputs provided to PE2 at 148. As shown, the current block bit stream is delayed by a two-pixel distance 147, and the pixels of the latch output, which are aligned with the current block columns, comprise pixels 3 through 16 of the upper band columns, illustrated at 149, and pixels 1 and 2 of the lower band columns, illustrated at 150.

By the time the input signals have propagated to the sixteenth processing unit PU15, the current block input has been delayed by 120 clock cycles (15 pixels) due to the one pixel delay in the previous fifteen processing units; and, at the latch output to module 90, the hybrid input pixels consist of columns of pixels that begin with the last (16th) pixel of the upper band columns followed by fifteen top pixels of the corresponding lower band columns. Accordingly, the latch output to module 90 represents the search block (−8, +7), which is illustrated in FIG. 10 as 128. The timing diagram for the inputs to PU15 is illustrated at 151 in FIG. 11. The latch output to module 90 is synthesized by inserting the fifteenth pixel of the lower band columns into the bit stream in response to the delayed select upper band signal. The inserted pixels are illustrated as 153 and 154.

The pattern described above for the first sixteen processing units is repeated for every succeeding group of sixteen processing units. At the output of PU15, the current band bit stream has been delayed by 16 pixels, relative to the upper band bit stream. Accordingly, at the inputs to PU16, the pixels of the first column of the current block are aligned with the second upper band column. Accordingly, the seventeenth processing unit PU16 computes the error for the search block (−7, −8) illustrated as 125 in FIG. 10. This block consists of pixels of the upper band only and it is shifted to the right by one column in relation to the search block (−8, −8), which was processed by PU0. To supply pixels (−7, −8) to module 90 synchronously with the current block pixels, the upper band output of the sixteenth processing unit (PU15) is directly connected to the module of PU16 via a delay means which introduces a delay that is the same as that of latch 91.

FIGS. 12 to 16 provide further illustration of pixel alignment for PU0, PU1, PU2, PU15 and PU16 respectively. The current frame pixels are identified as C(i,j) and the previous band pixels are identified as P(i, j), where (i,j) designates the offset of a pixel with respect to the upper left-hand corner of the current block. The columns of the tables provided in FIGS. 12-16 illustrate the sequences of pixels provided to the corresponding inputs. The rows indicate the pixels aligned in time. Each pixel of the current frame is compared with the pixel on the same row in the hybrid signal. Otherwise, FIGS. 12-16 are self-explanatory.

Figure 17:
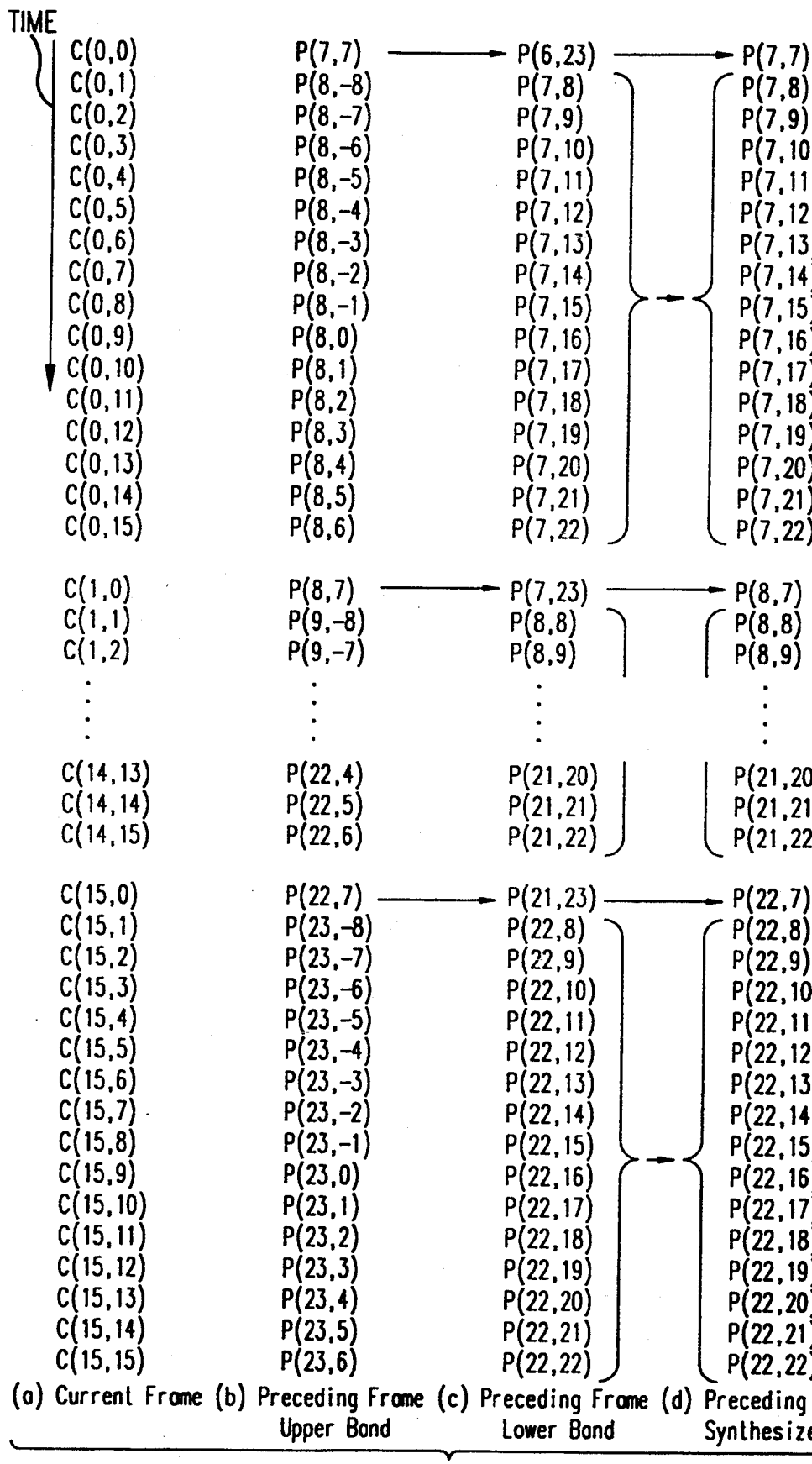

FIG. 17 illustrates the pixel alignment for the last processing unit PU255, which determines the error for the search block (+7,+7), illustrated at 128 in FIG. 10. At the input to PU255, the current frame bit stream has been delayed by 2040 clock cycles (255 pixels) relative to the upper band delays. Accordingly, the pixel C(0,0) of the current frame is aligned in time with the pixel P(7,7) transmitted from the output of latch 91. Also, note that, since PU255 is the sixteenth unit of the last sixteen-unit group, the pixels of the synthesized bit stream columns comprise the bottom pixels of the upper band columns followed by fifteen top pixels of the corresponding lower band column.

The right side of the processing unit circuit illustrated in FIG. 9 comprises two delay means 95 and 96 and two drivers 97 and 98. These components are responsible for the output of the computed errors and for resetting the accumulator 91 at the beginning of each new block.

As discussed previously, the end of block (EOB) signal is supplied to the first processing unit immediately after the last pixel of the current block bit stream. When the end of block signal is asserted, driver 97 transfers the computed low order byte of the error value from the accumulator 92 to the ELOB output 8 (ELOB bus). The start of block (SOB) signal for the next current block then resets the low order byte register of the accumulator 92. Since the start of block signal for the next current block arrives subsequent to the rising edge of the end of block signal, the low-order byte register is reset after the low order byte has been read out to the ERL output. Delay means 95 and 96 delay the start of block and the end of block signals by eight clock cycles each. The delayed end of block signal causes the driver 98 to transfer the high order byte of the error value to the EHOB output 29 (EHOB bus) one pixel after the low order byte is read out. The delayed start of block signal resets the high order byte register of the accumulator 92. Since the start of block signals trails the end of block signal, the reset signal occurs after the high order error byte has been read.

Since delay means 95 delays the end of block signal by one pixel, the EOB signal propagates through the array at the same rate as the last pixel of the current block. At each processing unit the low order and high order bytes are read out of the accumulator and provided in order to the outputs of the processor array.

A parallel pipelined system has to output the results essentially at the input rate, except for a certain initial delay. This principle is carried out in the system of the present invention. Few, if any, clock cycles are lost in the changeover from one block in the current band to the next. In all the processing units, the absolute difference modules 90 and the accumulator 92 are almost always productively engaged except for a delay due to the indentation of the current blocks at the left and right edges of the frame. Also, it should be noted that the error, placed on the ELOB and EHOB output busses by an element PUn, immediately follows the error placed on the output busses by the element PU(n−1), where n=1, . . . ,255. As a result, the errors appear at the output of the array in the order in which they are created, i.e., according to Table I, and 256 error values exactly fill the 256 time slots available between the start of block and the end of block signals for a particular current block.

Figure 18:
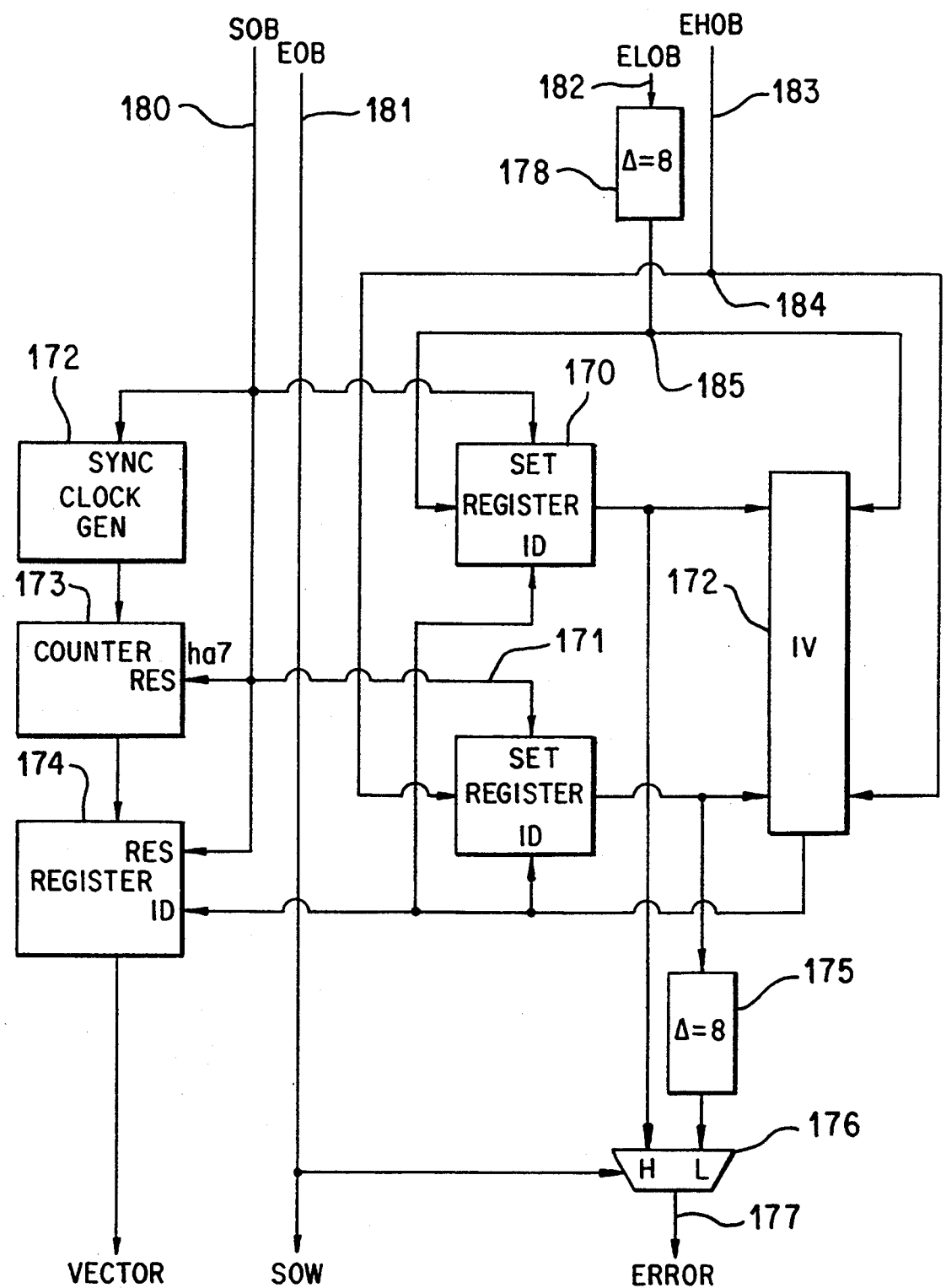
-and FIG. 18 is a block diagram of the minimal error module.

FIG. 18 illustrates the circuitry of the minimum error module 71, which receives the error values generated by the processors, and determines the minimum error and the corresponding displacement vector for a given current block. Registers 170 and 171 hold the current minimum value, which is the minimum error determined at a given stage of processing. Comparator 172 compares the current minimum stored in 170 and 171 to the bytes of the incoming error value, and, if the error is less than the error stored in 170 and 171, the incoming error value is loaded into the registers 170 and 171. Clock generator 172 generates a pulse every 9 clock cycles and an eight-bit counter 173 counts the generated pulses. Every time the comparator 172 loads a new minimum value into the registers 170 and 171 the value stored in the counter 173 is loaded into register 174.

The inputs to the minimal error module include start of block input 180, end of block input 181, error low order byte 182, and error high order byte 183. The inputs are connected to the corresponding outputs of the last processing unit PU255. PU255 outputs the errors continuously with one clock cycle delay between the bytes due to the delays introduced by the delay means 106 and 107 of each of the processing units. The low order error bytes precede in time the high order error bytes by eight clock cycles. Delay means 178 delays the low order error output by eight clock cycles such that at points 184 and 185 the high and low error bytes enter in parallel.

The start of block signal resets the counter 173 and the register 174. It also sets both registers 170 and 171 to the value 11111111, which is the highest value that can be held by these eight-bit registers. Accordingly, when the first error value arrives from block (−8,−8), it is loaded into 170 and 171, since any input error value is equal or less than 1111111111111111 held by 170 and 171 in combination. The start of block signal also synchronizes the clock generator 172 to issue a pulse every time a new error output, generated for another search block, arrives at the points 184, 185. Thus, the counter 173, which counts the pulses generated by the clock generator, always holds the sequential number of the processor which generated the error provided to the minimum error module.

As indicated, if the input error value is less than the value stored in the registers 170 and 171, the comparator issues a signal which loads the input error value into the registers 170 and 171. Thus, the registers always hold the minimum value supplied to the minimum error module for a given search window. The signal that loads the error value to 170 and 171 also loads the contents of the counter 173 into the register 174. Accordingly, register 174 holds the sequential number of the processor which computed the lowest error value.

After the error values of all the processing units have been supplied to the minimum error module, registers 170 and 171 hold the minimum error value, and register 174 holds the position of the processing unit that generated the minimum error value and, thus, the displacement vector. Delay means 175 and multiplexer 176 output the two bytes of the minimum error value serially to the output 177.

The end of block signal for the current block reaches the minimum error module immediately after the error value calculated by the last processing unit PU255 and terminates the minimum error computation. After the output of the last processing unit has been compared to the current minimum stored in the registers 170 and 171, the end of block signal causes the current minimum to be read serially through the multiplexer 177. The eight-bit delay, introduced by delay means 175, allows for merging two error bytes into a single signal. At this point, register 174 contains the position of the processor which generated the minimum error. This value can be translated into the displacement vector according to Table I. The end of block signal is shown as start of word output signal 190 that designates the beginning of the minimum error output.

The embodiment of the invention described above is presented for purposes of illustration and should not be construed as limiting the invention in any way. As emphasized above, other embodiments will be evident which do not depart from the spirit of the present invention, which scope is defined by the following claims.

I claim:

1. An apparatus for comparing a first frame of data with respect to a second frame comprising:
a linear array of processing units through which the first and the second frames of data are propagated, wherein each of the processing units determines an error, which is a measure of a difference between a current block of elements of the first frame and one of a plurality of search blocks of elements of the second frame, each of the plurality of the search blocks being located within a search window,
each of the processing units comprising a plurality of inputs, a plurality of outputs, and synchronization means for synchronizing input data representing the elements of the first frame with input data representing the elements of the second frame, such that each processing unit of the array determines the error between the current block and a different search block of the search window;
wherein the plurality of inputs of each of the processing units comprises a first input for data representing the elements of a first portion of the search window, a second input for data representing the elements of a second portion of the search window, and a current input for data representing the elements of the current block;

wherein the plurality of inputs of each of the processing units comprises a synthesized input for data representing the elements of a search block of the plurality of search blocks, the synthesized input elements being aligned in time with the current block elements, so that each processing unit determines the error between the search block and the current block;

wherein the synchronization means of the processing units comprises means for combining the data transmitted to the first and second inputs in order to generate a synthesized bit stream for the synthesized input to a next processing unit of the array of the processing units.

2. The apparatus of claim 1 wherein the array receives continuous streams of data representing the elements of the first and second frames, and the array outputs a continuous sequence of error values, each of which error values corresponds to the error between the current block and one of the plurality of the search blocks.

3. The apparatus of claim 1 wherein the synchronization means further comprises means for delaying the data transmitted to a current input, so as to align the elements of the current block with the elements of the different search block of the plurality of search blocks, for input to a next processing unit of the array of processing units.

4. The apparatus of claim 3 wherein the means for delaying delays the data transmitted to the current input by a number of bits corresponding to one element of the first frame.

5. The apparatus of claim 1 wherein each of the processing units further comprises means for determining an absolute value of the difference between two digital signals representing one element of the current block and one element of one of the plurality of the search blocks.

6. The apparatus of claim 5 wherein each of the processing units further comprises means for adding the absolute values of the differences between the elements, such that, after all bits representing the elements of the current block and a search block of the plurality of the search blocks have been supplied to a particular processing unit, the accumulated difference between the elements of the current block and the search block is stored in the means for adding.

7. The apparatus of claim 6 wherein the means for adding the absolute values of the differences between the elements is an accumulator.

8. The apparatus of claim 7 wherein each of the processing units further comprises means for outputting the error value stored in the accumulator.

9. The apparatus of claim 8 wherein the outputting means transfers a first byte of the error from the accumulator to a low order byte error output in response to an end of block signal applied to an end of block input and transfers a second byte of the error from the accumulator to a high order error output in response to the end of block signal, which is delayed such that the accumulator transfers the second byte after transferring the first byte.

10. The apparatus of claim 1 wherein the plurality of outputs of each of the processing units comprises a lower output, an upper output, and a current output.

11. The apparatus of claim 10 wherein the outputs of each of the processing units, except for a processing unit which is a last one in the array, are connected to the corresponding inputs of an adjacent unit in the array.

12. The apparatus of claim 1 wherein the plurality of inputs of each of the processing units comprises a lower input, an upper input and a current input and wherein the data transmitted to the upper, the lower and the current inputs represents the elements arranged by columns, and the elements of each column enter from top to bottom.

13. The apparatus of claim 1 wherein the plurality of inputs of each of the processing units comprises a start of block input and an end of block input for providing signals that indicate respectively a first and a last element of the current block.

14. The apparatus of claim 1 wherein the plurality of inputs of each of the processing units comprises a current input and an end of column input for providing signals that indicate the end of each column of elements transmitted to the current input.

15. The apparatus of claim 1 wherein the plurality of inputs of each of the processing units comprises a low order byte error input and a high order byte error input for transmitting the error generated by a previous processing unit in the array.

16. The apparatus of claim 10 wherein the plurality of outputs further comprises a start of block output, an end of block output, a low order byte error output, and a high order byte error output.

17. The apparatus of claim 1 wherein the array comprises 256 processing units and the search window comprises 256 search blocks.

18. The apparatus of claim 1 further comprises a minimum error module having start of block, end of block, high order byte error, and low order byte error inputs that are connected to the corresponding outputs of the last processing unit of the array, the minimum error module determining a minimum value among the error values generated by each of the processing units.

19. The apparatus of claim 18 wherein the minimum error module comprises a first register means and a comparator; the comparator compares input error data transmitted to the minimum error module at the high and the low order byte error inputs to a value stored in the first register means; and, if the value of the input error is less than the value stored in the first register means, the input error data is stored in the first register means.

20. The apparatus of claim 19 wherein the minimum error module further comprises a second register means for data representing a position in the array of the processing unit that generated the error value stored in the first register means.

21. A method for generating a sequence of displacement vectors and associated minimal error values, each of which vectors and values represent a best match of a current block of elements of a first frame of a signal with one of a plurality of search blocks of elements located within a search window of a second frame, comprising:

transmitting a first stream of data, representing the elements of the first frame, to a linear array of processing units;

transmitting a second stream of data, representing the elements of the second frame, to the array;

synthesizing a hybrid stream of data from the elements of the second stream, such that the elements of the hybrid stream are aligned in time with the elements of the first stream so as to enable each processing unit of the array to compute an error between the current block and a different search block of the plurality of search blocks within the search window, which error is a measure of a difference between two blocks of elements; and computing the errors between the current block and each search block of the search window such that each processing unit of the array outputs the computed error essentially immediately after a previous unit in the array outputs the error;

wherein the second stream of data represents the elements of upper and lower portions of the search windows of the second frame;

wherein the step of synthesizing comprises combining data representing the upper and lower portions of the search window into the hybrid stream of data;

wherein the step of combining comprises periodically inserting the data representing the lower portion of the search window into the hybrid stream of data.

22. The method of claim 21 wherein each processing unit of the array begins computing the error for a new current block essentially immediately after outputting the error for a previous current block.

23. The method of claim 21 further comprising the step of delaying the first stream of data relative to the second stream at each processing unit of the array.

24. The method of claim 21 further comprising the step of transmitting an end of block signal to the array.

25. The method of claim 24 further comprising the step of outputting the errors generated by each array element in response to the end of block signals.

* * * * *